(12) United States Patent
Oike et al.

(10) Patent No.: US 10,341,626 B2
(45) Date of Patent: Jul. 2, 2019

(54) IMAGE PROJECTION SYSTEM, PROJECTOR, AND CONTROL METHOD FOR IMAGE PROJECTION SYSTEM

(71) Applicant: SEIKO EPSON CORPORATION, Tokyo (JP)

(72) Inventors: Takumi Oike, Matsumoto (JP); Takashi Toyooka, Matsumoto (JP); Shiki Furui, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/332,396

(22) Filed: Oct. 24, 2016

(65) Prior Publication Data

US 2017/0127028 A1 May 4, 2017

(30) Foreign Application Priority Data

Oct. 29, 2015 (JP) .................................. 2015-212500

(51) Int. Cl.
*H04N 9/12* (2006.01)
*H04N 9/31* (2006.01)

(52) U.S. Cl.
CPC ......... *H04N 9/3182* (2013.01); *H04N 9/3147* (2013.01); *H04N 9/3185* (2013.01)

(58) Field of Classification Search
CPC .................................................... H04N 9/3197
USPC .................................. 348/744, 189; 345/593
See application file for complete search history.

(56) References Cited

U.S. PATENT DOCUMENTS

| | | | | |
|---|---|---|---|---|
| 6,525,772 | B2 * | 2/2003 | Johnson | H04N 9/12 348/189 |
| 6,558,006 | B2 | 5/2003 | Ioka | |
| 7,114,813 | B2 | 10/2006 | Wada et al. | |
| 2013/0215138 | A1 * | 8/2013 | Suzuki | G06T 11/001 345/593 |
| 2013/0222386 | A1 * | 8/2013 | Tannhauser | G06T 11/60 345/428 |
| 2014/0354674 | A1 | 12/2014 | Okamoto et al. | |

FOREIGN PATENT DOCUMENTS

| | | |
|---|---|---|
| JP | 2002-72359 A | 3/2002 |
| JP | 2004-336225 A | 11/2004 |
| JP | 2007-300539 A | 11/2007 |
| JP | 2008-187362 A | 8/2008 |
| JP | 2010-085562 A | 4/2010 |
| JP | 2014-235295 A | 12/2014 |

* cited by examiner

*Primary Examiner* — Jefferey F Harold
*Assistant Examiner* — Sihar A Karwan
(74) *Attorney, Agent, or Firm* — Oliff PLC

(57) ABSTRACT

A target color is set on the basis of a first captured image obtained by capturing, with an imaging section, at least a part of a first image projected by a projection optical system of a projector. First correction data for correcting a color of a projected image of another projector to the target color is calculated on the basis of a second captured image obtained by capturing, with the imaging section, at least a part of a second image projected by the projection optical system of the other projector.

8 Claims, 12 Drawing Sheets

IMAGE PROJECTION SYSTEM, PROJECTOR, AND CONTROL METHOD FOR IMAGE PROJECTION SYSTEM

The entire disclosure of Japanese Patent Application No. 2015-212500, filed Oct. 29, 2015 is expressly incorporated by reference herein.

BACKGROUND

1. Technical Field

The present invention relates to an image projection system, a projector, and a control method for the image projection system.

2. Related Art

There has been known a technique for joining images projected by a plurality of projectors and displaying one large image. It is known that, when the images are projected by the plurality of projectors, a shift occurs in colors of the images projected by the projectors because of individual differences and the like of the projectors (see, for example, JP-A-2002-72359 (Patent Literature 1)). In an image projection display apparatus disclosed in Patent Literature 1, in order to correct color differences among the projectors, for the plurality of projectors, images in highest gradation levels are sequentially projected on screens in the order of red (R), green (G), and blue (B) and respective captured images are sequentially captured in a colorimetric system. A correction matrix is calculated for each of the projectors and input signals are corrected using obtained correction matrixes to make XYZ values of projection surface center positions of all the projectors the same.

However, when a projection surface on which images are projected is captured by a plurality of imaging apparatuses mounted on the plurality of projectors and a color shift of images projected from the plurality of projectors is corrected, the imaging apparatus of one projector sometimes cannot capture the entire projection surface. That is, since the projector is set in a position desired for image projection, in some case, a sufficient distance cannot be secured between the imaging apparatus and the projection surface and the image imaging apparatus cannot capture the entire projection surface.

When the color shift of the images is corrected using the plurality of imaging apparatuses mounted on the plurality of projectors, since the imaging apparatuses mounted on the projectors have individual differences in sensitivity, an error occurs in imaging values imaged by the imaging apparatuses.

SUMMARY

An advantage of some aspects of the invention is to accurately perform, when images are projected by a plurality of projectors, correction of the images projected by the projectors to target colors.

An image projection system according to an aspect of the invention includes: a first projector; and a second projector. The first projector includes: a first projecting section configured to project a first image; and a first imaging section configured to capture a range including at least a part of the first image projected by the first projecting section and at least a part of a second image projected by the second projector. The second projector includes a second projecting section configured to project the second image. The image projection system sets a target color on the basis of a first captured image obtained by capturing, with the first imaging section, at least a part of the first image projected by the first projecting section and calculates, on the basis of a second captured image obtained by capturing, with the first imaging section, at least a part of the second image projected by the second projecting section, first correction data for correcting a color of a projected image of the second projector to the target color.

According to the aspect of the invention, the target color can be set on the basis of the first captured image obtained by capturing the first image with the first imaging section. The first correction data for correcting the color of the projected image of the second projector to the target color can be calculated on the basis of the second captured image obtained by capturing the second image with the first imaging section. Therefore, when images are projected by a plurality of projectors, it is possible to accurately perform correction of the images projected by the projectors to the target color.

The image projection system according to the aspect of the invention may be configured such that the image projection system sets an imaging value of a first position on the first captured image as the target color and calculates the first correction data for correcting the projected image in the second projector such that an imaging value of a second position on the second captured image is corrected to the imaging value of the first position.

According to the aspect of the invention with this configuration, the imaging value of the first position on the first captured image can be set as the target color and the imaging value of the second position on the second captured image can be corrected to be the target color. Therefore, when images are projected by the plurality of projectors, it is possible to highly accurately perform the correction to the target color.

The image projection system according to the aspect of the invention may be configured such that the first projector includes: a first calculating section configured set an imaging value of the first position on the first captured image as the target color and calculate the first correction data for correcting the projected image such that an imaging value of the second position on the second captured image is corrected to the imaging value of the first position; and a transmitting section configured to transmit the first correction data calculated by the first calculating section to the second projector.

According to the aspect of the invention with this configuration, the first projector can calculate the first correction data and transmit the calculated first correction data to the second projector.

The image projection system according to the aspect of the invention may be configured such that the first correction data is data for correcting a color of a predetermined point in the second captured image to the target color, the second projector includes a second imaging section configured to capture a range including at least a part of the second image projected by the second projecting section, and the image projection system calculates, on the basis of a third captured image obtained by capturing, with the second imaging section, at least a part of the second image projected by the second projecting section, second correction data for correcting colors of a plurality of places in the second image to the color of the predetermined point.

According to the aspect of the invention with this configuration, the second correction data for correcting the colors of the plurality of places in the second image to the color of the predetermined point can be calculated on the basis of the third captured image obtained by capturing, with the second imaging section, the second image projected by the second projecting section. Therefore, it is possible to correct the colors of the plurality of places in the second image to the color of the predetermined point.

The image projection system according to the aspect of the invention may be configured such that the first projector includes a second calculating section configured to calculate, on the basis of the third captured image received from the second projector, the second correction data for correcting the colors of the plurality of places in the second image to the color of the predetermined point.

According to the aspect of the invention, it is possible to calculate the second correction data in the first projector on the basis of the third captured image captured by the second projector.

The image projection system according to the aspect of the invention may be configured such that the first projector includes: a first calculating section configured to set an imaging value of the first position on the first captured image as the target color and calculate the first correction data for correcting the second image in the second projector such that an imaging value of the second position on the second captured image is corrected to the imaging value of the first position; and a transmitting section configured to transmit the first correction data calculated by the first calculating section to the second projector, and the second projector calculates, on the basis of the first correction data received from the first projector, the second correction data for correcting colors of a plurality of places in the second image to the color of the predetermined point.

According to the aspect of the invention with this configuration, it is possible to transmit the first correction data calculated by the first projector to the second projector and calculate, in the second projector, on the basis of the first correction data, the second correction data for correcting the colors of the plurality of places in the second image to the color of the predetermined point.

An image projection system according to another aspect of the invention includes: a first projector; and a second projector. The first projector includes: a first projecting section configured to project a first image; and a first imaging section configured to capture a range including at least a part of the first image projected by the first projecting section and at least a part of a second image projected by the second projector. The second projector includes a second projecting section configured to project the second image. The image projection system calculates, on the basis of a first captured image obtained by capturing, with the first imaging section, at least a part of the first image projected by the first projecting section, third correction data for correcting a color of a projected image of the first projector to a target color set in advance and calculates, on the basis of a second captured image obtained by capturing, with the first imaging section, at least a part of the second image projected by the second projecting section, fourth correction data for correcting a color of a projected image of the second projector to the target color.

According to the aspect of the invention, the third correction data for correcting the color of the projected image of the first projector to the target color can be calculated on the basis of the first captured image obtained by capturing the first image. The fourth correction data for correcting the color of the projected image of the second projector to the target color can be calculated on the basis of the second captured image obtained by capturing the second image. Therefore, when images are projected by a plurality of projectors, it is possible to accurately perform correction of the images projected by the projectors to the target color.

An image projection system according to still another aspect of the invention includes: a first projector; and a second projector. The first projector includes: a first projecting section configured to project a first image; and a first imaging section configured to capture a range including at least a part of the first image projected by the first projecting section and at least a part of a second image projected by the second projector. The second projector includes: a second projecting section configured to project the second image; and a second imaging section configured to capture a range including at least a part of the first image projected by the first projecting section and at least a part of the second image projected by the second projector. The image projection system sets a target color on the basis of a first captured image obtained by capturing, with the first imaging section, at least a part of the first image projected by the first projecting section and calculates, on the basis of a second captured image obtained by capturing, with the second imaging section, at least a part of the second image projected by the second projecting section, first correction data for correcting a color of a projected image of the second projector to the target color.

According to the aspect of the invention, the target color can be set on the basis of the first captured image obtained by capturing the first image. The first correction data for correcting the color of the projected image of the second projector to the target color can be calculated on the basis of the second captured image obtained by capturing the second image. Therefore, when images are projected by a plurality of projectors, it is possible to accurately perform correction of the images projected by the projectors to the target color.

An image projection system according to yet another aspect of the invention includes: a first projector; and a second projector. The first projector includes: a first projecting section configured to project a first image; and a first imaging section configured to capture a range including at least a part of the first image projected by the first projecting section and at least a part of a second image projected by the second projector. The second projector includes: a second projecting section configured to project the second image; and a second imaging section configured to capture a range including at least a part of the first image projected by the first projecting section and at least a part of the second image projected by the second projector. The image projection system calculates, on the basis of a first captured image obtained by capturing, with the first imaging section, at least a part of the first image projected by the first projecting section, third correction data for correcting a color of a projected image of the first projector to a target color set in advance and calculates, on the basis of a second captured image obtained by capturing, with the second imaging section, at least a part of the second image projected by the second projecting section, fourth correction data for correcting a color of a projected image of the second projector to the target color.

According to the aspect of the invention, the third correction data for correcting the color of the projected image of the first projector to the target color can be calculated on the basis of the first captured image obtained by capturing the first image. The fourth correction data for correcting the color of the projected image of the second projector to the target color can be calculated on the basis of the second captured image obtained by capturing the second image. Therefore, when images are projected by a plurality of projectors, it is possible to accurately perform correction of the images projected by the projectors to the target color.

A projector according to still yet another aspect of the invention includes: a projecting section configured to project a first image; an imaging section configured to capture a range including at least a part of the first image projected by the projecting section and at least a part of a second image projected by another projector; and a first calculating section configured to set a target color on the basis of a first captured image obtained by capturing, with the imaging section, at least a part of the first image projected by the projecting section and calculates, on the basis of a second captured image obtained by capturing, with the imaging section, at least a part of the second image projected by the other projector, first correction data for correcting a color of a projected image of the other projector to the target color.

According to the aspect of the invention, the target color can be set on the basis of the first captured image obtained by capturing the first image. The first correction data for correcting the color of the projected image of the other projector to the target color can be calculated on the basis of the second captured image obtained by capturing of the second image projected by the other projector. Therefore, it is possible to accurately perform correction of an image projected by the projector to the target color.

A projector according to further another aspect of the invention includes: a projecting section configured to project a first image; an imaging section configured to capture a range including at least a part of the first image projected by the projecting section and at least a part of a second image projected by another projector; and a first calculating section configured to calculate, on the basis of a first captured image obtained by capturing, with the imaging section, at least a part of the first image projected by the projecting section, third correction data for correcting a color of a projected image projected by the projecting section to a target color set in advance and calculate, on the basis of a second captured image obtained by capturing, with the imaging section, at least a part of the second image projected by the projector, fourth correction data for correcting a color of a projected image of the other projector to the target color.

According to the aspect of the invention, the third correction data for correcting the color of the projected image projected by the projector to the target color can be calculated on the basis of the first captured image obtained by capturing the first image. The fourth correction data for correcting the color of the projected image of the other projector to the target color can be calculated on the basis of the second captured image obtained by capturing the second image projected by the other projector. Therefore, it is possible to accurately perform correction of an image projected by the projector to the target color.

A control method for an image projection system according to still further another aspect of the invention includes a first projector and a second projector, the control method including: capturing, with a first imaging section of the first projector, a range including at least a part of a first image projected by the first projector and at least a part of a second image projected by the second projector; setting a target color on the basis of a first captured image obtained by capturing at least a part of the first image with the first imaging section of the first projector; and calculating, on the basis of a second captured image obtained by capturing at least a part of the second image with the first imaging section of the first projector, first correction data for correcting a color of a projected image of the second projector to the target color.

According to the aspect of the invention, the target color can be set on the basis of the first captured image obtained by capturing the first image with the first imaging section. The first correction data for correcting the color of the projected image of the second projector to the target color can be calculated on the basis of the second captured image obtained by capturing the second image with the first imaging section. Therefore, when images are projected by a plurality of projectors, it is possible to accurately perform correction of the images projected by the projectors to the target color.

A control method for an image projection system according to yet further another aspect of the invention includes a first projector and a second projector, the control method including: capturing, with a first imaging section of the first projector and a second imaging section of the second projector, a range including at least a part of a first image projected by the first projector and at least apart of a second image projected by the second projector; setting a target color on the basis of a first captured image obtained by capturing at least a part of the first image with the first imaging section of the first projector; and calculating, on the basis of a second captured image obtained by capturing at least a part of the second image with the second imaging section, first correction data for correcting a color of a projected image of the second projector to the target color.

According to the aspect of the invention, the target color can be set on the basis of the first captured image obtained by capturing the first image. The first correction data for correcting the color of the projected image of the second projector to the target color can be calculated on the basis of the second captured image obtained by capturing, with the second imaging section, the second image projected by the second projector. Therefore, when images are projected by a plurality of projectors, it is possible to accurately perform correction of the images projected by the projectors to the target color.

The control method for the image projection system according to the aspect of the invention may be configured such that the capturing the range includes alternately switching the projection of the first image by the first projector and the projection of the second image by the second projector and alternately capturing at least a part of the first image and at least a part of the second image.

According to the aspect of the invention with this configuration, it is possible to alternately switch and project the first image and the second image and alternately capture at least a part of the first image and at least a part of the second image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
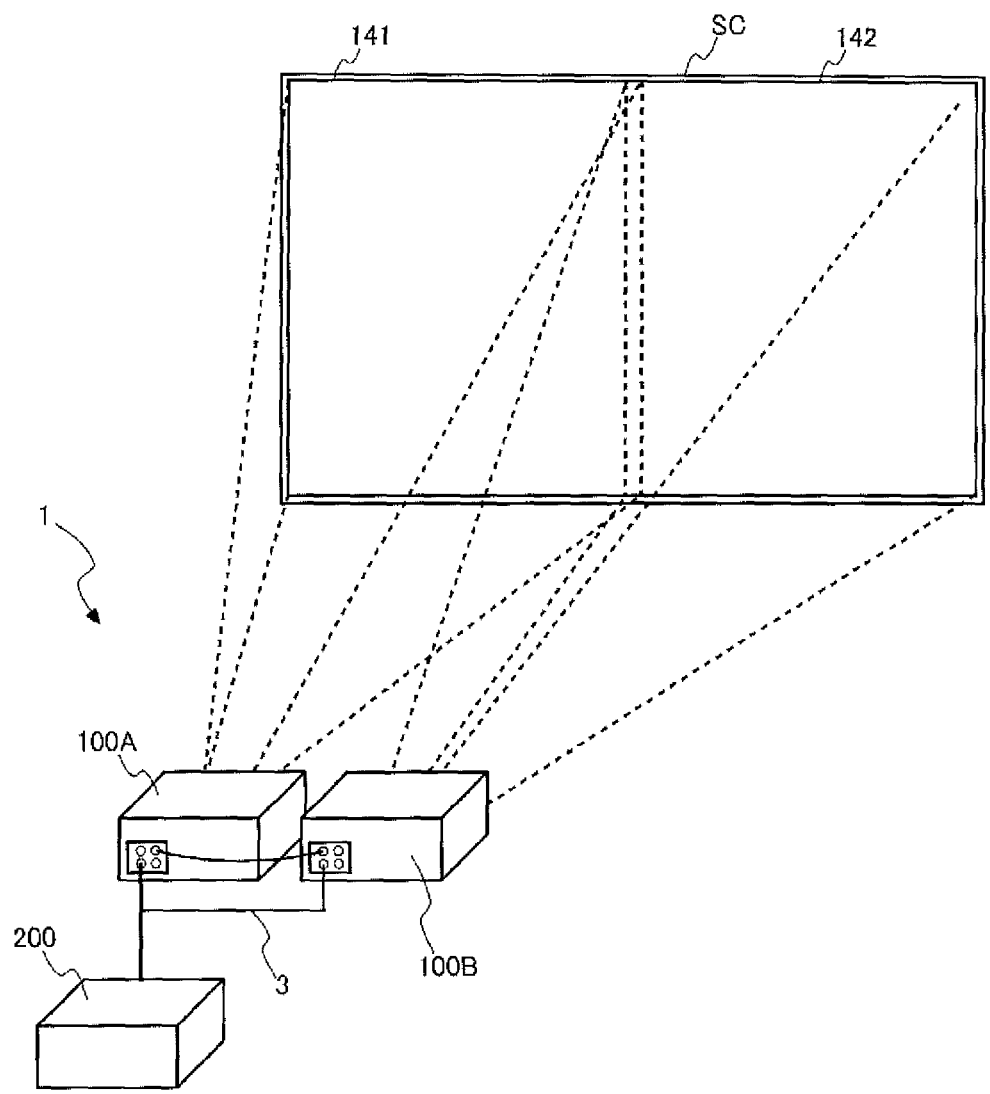
FIG. 1 is a system configuration diagram of an image projection system.

Embodiments of the invention are explained below with reference to the drawings. FIG. 1 is a system configuration diagram of an image projection system 1.

The image projection system 1 shown in FIG. 1 includes projectors 100A and 100B (a first projector and a second projector) and an image supply apparatus 200 that supplies image data to the projectors 100A and 100B.

In FIG. 1, the projectors 100A and 100B are shown as projectors. However, the number of projectors is not limited to two. In the following explanation, when it is unnecessary to distinguish the projector 100A and the projector 100B, the projector 100A and the projector 100B are referred to as projectors 100.

The projector 100A and the projector 100B are disposed in front of a screen SC functioning as a projection surface and project images on the screen SC.

In this embodiment, the projector 100A and the projector 100B are disposed adjacent to each other in the lateral direction (the horizontal direction). The projector 100A and the projector 100B project images on different regions of the screen SC. In general, when projecting the images in this way, the projectors 100A and 100B adjacent to each other project the images such that parts of projected regions of the images overlap each other.

The projectors 100A and 100B are connected to the image supply apparatus 200. The projectors 100A and 100B project images supplied from the image supply apparatus 200 on the screen SC. In this embodiment, the projector 100A projects the image on the left side of the screen SC and the projector 100B projects the image on the right side of the screen SC. In the following explanation, a region of the screen SC on which the projector 100A projects the image is referred to as first projection region 141 and a region of the screen SC on which the projector 100B projects the image is referred to as second projection image 142.

Figure 2:
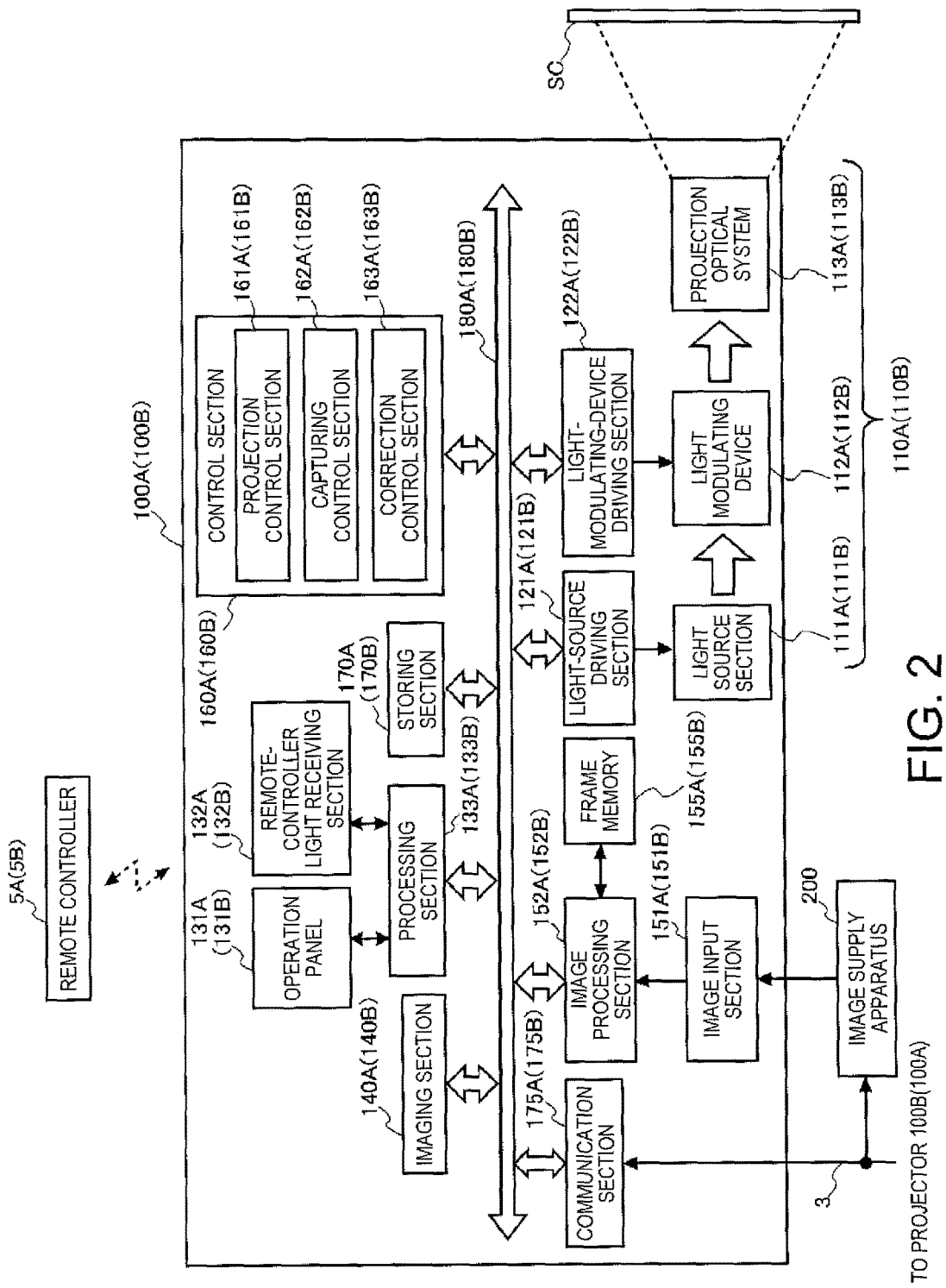
FIG. 2 is a configuration diagram showing the configuration of projectors.

FIG. 2 is a configuration diagram showing the configuration of the projector 100A. The projector 100A and the projector 100B include substantially the same configurations. Therefore, the configuration of the projector 100A is representatively explained.

The image supply apparatus 200 is connected to the projector 100A. The image supply apparatus 200 is an apparatus that supplies an image signal to the projector 100A. The projector 100A projects, on the screen SC, an image based on the image signal supplied from the image supply apparatus 200 or image data stored in advance in a storing section 170A explained below. As the image supply apparatus 200, for example, a video player, a DVD (Digital Versatile Disk) player, a television tuner apparatus, a set top box of a CATV (Cable television), a video output apparatus of a video game apparatus or the like, or a personal computer is used.

The projector 100A includes an image input section 151A. The image input section 151A includes a connector, to which a cable is connected, and an interface circuit (both of which are not shown in the figure). An image signal supplied from the image supply apparatus 200 connected via the cable is input to the image input section 151A. The image input section 151A converts the input image signal into image data and outputs the image data to an image processing section 152A.

The interface included in the image input section 151A may be an interface for data communication such as Ethernet (registered trademark), IEEE1394, or USB. The interface of the image input section 151A may be an interface for image data such as MHL (registered trademark), HDMI (registered trademark), or DisplayPort.

The image input section 151A may include, as the connector, a VGA terminal to which an analog video signal is input and a DVI (Digital Visual Interface) terminal to which digital video data is input. Further, the image input section 151A includes an A/D conversion circuit. When the analog video signal is input via the VGA terminal, the image input section 151A converts, with the A/D conversion circuit, the analog video signal into image data and outputs the image data to the image processing section 152A.

The projector 100A includes a display section 110A that performs formation of an optical image and projects (displays) the image on the screen SC. The display section 110A includes alight source section 111A functioning as alight source, a light modulating device 112A, and a projection optical system 113A.

The light source section 111A includes a light source such as a Xenon lamp, an ultra-high pressure mercury lamp, an LED (Light Emitting Diode), or a laser beam source. The light source section 111A may include a reflector and an auxiliary reflector that lead light emitted by the light source to alight modulating device 112A. Further, the light source section 111A may include a lens group for improving an optical characteristic of projected light, a sheet polarizer, a dimming element that reduces a light amount of the light emitted by the light source on a route leading to the light modulating device 112A, and the like (all of which are not shown in the figure).

The light source section 111A is driven by a light-source driving section 121A. The light-source driving section 121A is connected to an internal bus 180A. The light-source driving section 121A lights and extinguishes the light source of the light source section 111A according to control by a control section 160A.

The light modulating device 112A includes, for example, three liquid crystal panels corresponding to the three primary colors of RGB. Light emitted by the light source section 111A is separated into color lights of the three colors of RGB and made incident on the liquid crystal panels corresponding to the color lights. The three liquid crystal panels are transmissive liquid crystal panels. The liquid crystal panels modulate transmitted lights and generate image lights. The image lights passed through the liquid crystal panels and modulated are combined by a combination optical system such as a cross dichroic prism and emitted to the projection optical system 113A.

A light-modulating-device driving section 122A that drives the liquid crystal panels of the light modulating device 112A is connected to the light modulating device 112A. The light-modulating-device driving section 122A is connected to the internal bus 180A.

The light-modulating-device driving section 122A generates image signals of R, G, and B respectively on the basis of display image data (explained below) input from the image processing section 152A. The light-modulating-device driving section 122A drives, on the basis of the generated image signals of R, G, and B, the liquid crystal panels of the light modulating device 112A corresponding to the image signals and draws images on the liquid crystal panels.

The projection optical system (a first projecting section) 113A includes a lens group that projects image light modulated by the light modulating device 112A in the direction of the screen SC and focuses the image light on the screen SC. The projection optical system 113A may include a zoom mechanism for performing enlargement and reduction of a projected image on the screen SC and adjustment of a focal point and a focus adjusting mechanism for performing adjustment of a focus.

The projector 100A includes an operation panel 131A and a processing section 133A. The processing section 133A is connected to the internal bus 180A.

On the operation panel 131A functioning as a user interface, various operation keys and a display screen formed by a liquid crystal panel are displayed. When an operation key displayed on the operation panel 131A is operated, the processing section 133A outputs data corresponding to the operated key to the control section 160A. The processing section 133A causes the operation panel 131A to display various screens according to the control by the control section 160A.

A touch sensor that detects a touch on the operation panel 131A is superimposed on and integrally formed with the operation panel 131A. The processing section 133A detects, as an input position, a position on the operation panel 131A touched by a finger or the like of a user and outputs data corresponding to the detected input position to the control section 160A.

The projector 100A includes a remote-controller light receiving section 132A that receives an infrared signal transmitted from a remote controller 5A used by the user. The remote-controller light receiving section 132A is connected to the processing section 133A.

The remote-controller light receiving section 132A receives an infrared signal transmitted from the remote controller 5A. The processing section 133A decodes the infrared signal received by the remote-controller light receiving section 132A, generates data indicating operation content in the remote controller 5A, and outputs the data to the control section 160A.

The projector 100A includes an imaging section (a first imaging section, an imaging section) 140A.

The imaging section 140A includes a camera including an image pickup optical system, an image pickup element, and an interface circuit. The imaging section 140A captures a projecting direction of the projection optical system 113A according to control by the control section 160A.

A capturing range, that is, an angle of view of the imaging section 140A is an angle of view for setting, as a capturing range, a range including the screen SC and a peripheral section of the screen SC. The imaging section 140A outputs captured image data to the control section 160A.

The projector 100A includes a communication section (a transmitting section) 175A. The communication section 175A is an interface for performing data communication. In this embodiment, the communication section 175A is connected to a communication line 3. The communication section 175A transmits and receives various data to and from the projector 100B via the communication line 3 according to the control by the control section 160A. In this embodiment, the communication section 175A is a wired interface to which a cable (not shown in the figure) configuring the communication line 3 is connected. The communication section 175A may be a wireless communication interface that executes wireless communication such as a wireless LAN or Bluetooth (registered trademark). In this case, a part or the entire communication line 3 is configured by a wireless communication line.

The projector 100A includes an image processing system. The image processing system is configured centering on the control section 160A that collectively controls the entire projector 100A. Besides, the projector 100A includes the image processing section 152A, a frame memory 155A, and the storing section 170A. The control section 160A, the image processing section 152A, and the storing section 170A are connected to the internal bus 180A.

The image processing section 152A develops, according to the control by the control section 160A, in the frame memory 155A, the image data input from the image input section 151A. The image processing section 152A performs, on the image data developed in the frame memory 155A, processing such as resolution conversion (scaling) processing, resize processing, correction of distortion aberration, shape correction processing, digital zoom processing, and adjustment of a tone and brightness of an image. The image processing section 152A executes processing designated by the control section 160A and performs, according to necessity, the processing using parameters input from the control section 160A. Naturally, the image processing section 152A can also execute a plurality of kinds of processing among the kinds of processing in combination.

The image processing section 152A reads out the image data after the processing from the frame memory 155A and outputs the image data to the light-modulating-device driving section 122A as display image data.

The control section 160A includes hardware such as a CPU, a ROM, and a RAM (all of which are not shown in the figure). The ROM is a nonvolatile storage device such as a flash ROM and stores a control program and data. The RAM configures a work area of the CPU. The CPU develops the control program read out from the ROM or the storing section 170A in the RAM and executes the control program developed in the RAM to control the sections of the projector 100A.

The control section 160A includes a projection control section 161A, a capturing control section 162A, and a correction control section 163A. The functional blocks are realized by the CPU executing the control program stored in the ROM or the storing section 170A.

The projection control section 161A adjusts a display form of an image in the display section 110A and executes projection of an image on the screen SC.

Specifically, the projection control section 161A controls the image processing section 152A to carry out image processing on image data input from the image input section 151A. In this case, the projection control section 161A may read out, from the storing section 170A, parameters necessary for the processing by the image processing section 152A and output the parameters to the image processing section 152A.

The projection control section 161A controls the light-source driving section 121A to light the light source of the light source section 111A and adjust the luminance of the light source. Consequently, the light source emits light.

Image light modulated by the light modulating device 112A is projected on the screen SC by the projection optical system 113A.

The capturing control section 162A causes the imaging section 140A to execute capturing and acquires captured image data captured by the imaging section 140A.

The correction control section (a first calculating section, a second calculating section) 163A adjusts the chromaticities (colors, in particular, hues and chromas) of a projected image projected on the first projection region 141 by the projector 100A and a projected image projected on the second projection region 142 by the projector 100B. Details of the correction control section 163A are explained with reference to flowcharts of FIGS. 3 and 4.

The storing section 170A is a nonvolatile storage device and is realized by, for example, a storage device such as a flash memory, an EPROM (Erasable Programmable ROM), an EEPROM (Electrically EPROM), or a HDD (Hard Disc Drive). The storing section 170A stores pattern image data, which is image data projected on the screen SC by the display section 110A, and image data for adjustment.

Figure 3:
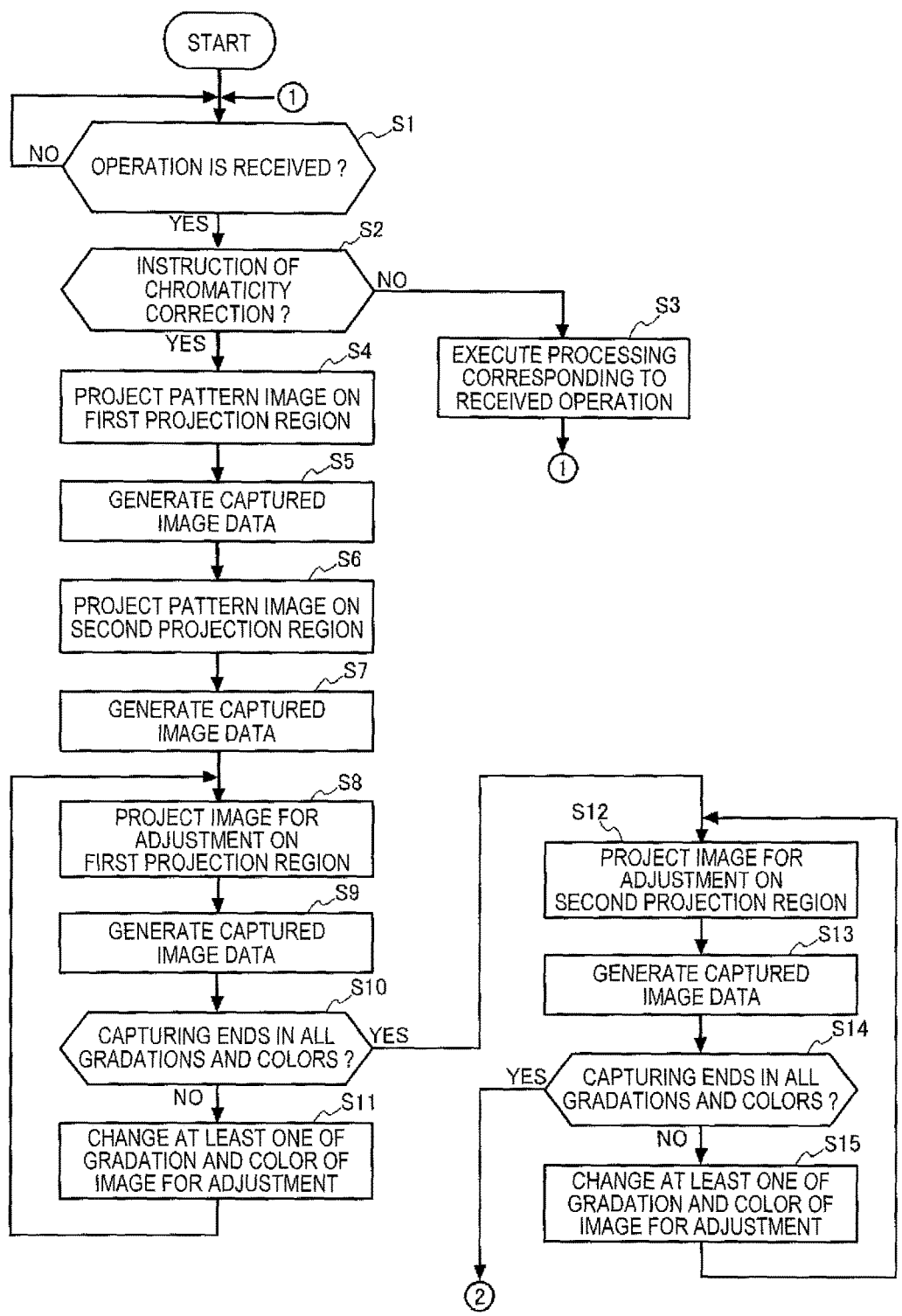
FIG. 3 is a flowchart for explaining the operation of the projectors in a first embodiment.
Figure 4:
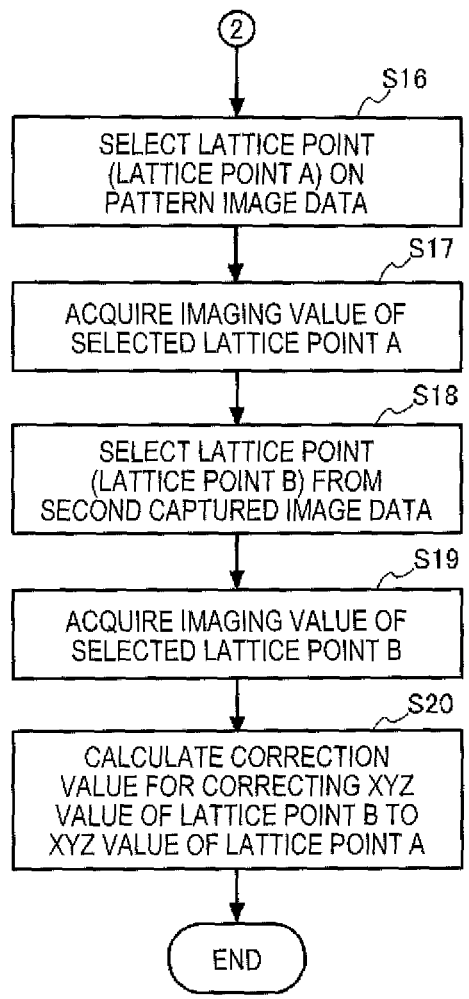
FIG. 4 is a flowchart for explaining the operations of the projectors in the first embodiment.

FIGS. 3 and 4 are flowcharts for explaining the operation of the projectors 100A and 100B in the first embodiment.

A processing flow of the flowcharts is a processing flow for performing chromaticity adjustment for an image projected on the screen SC by the projector 100A and an image projected on the screen SC by the projector 100B.

In the processing flow, the projector 100A operates as a master machine and the projector 100B operates as a slave machine. The projector 100A functioning as the master machine notifies the projector 100B of an image to be projected on the screen SC and timing for projecting the image and notifies the projector 100B of an instruction for capturing.

In the processing flow, it is assumed that the chromaticity (hue and chroma) of an image projected on the first projection region 141 by the projector 100A is uniform and the chromaticity of an image projected on the second projection region 142 by the projector 100B is uniform.

The processing flow is explained as processing for correcting the chromaticity of the image projected by the projector 100B, which is the slave machine, to coincide with or approach (hereinafter expressed as "match") the chromaticity of the image projected by the projector 100A, which is the master machine. However, the projectors 100A and 100B may perform processing for correcting the chromaticity of the image projected by the projector 100A to match the chromaticity of the image projected by the projector 100B.

The control section 160A of the projector 100A, which is the master machine, monitors an input of the processing section 133A and determines whether operation by the operation panel 131A or the remote controller 5A is received (step S1). When there is no input of data from the processing section 133A, the control section 160A determines that operation is not received (NO in step S1) and executes other processing until data is input from the processing section 133A or stays on standby until data is input.

When data is input from the processing section 133A, the control section 160A determines that operation is received (YES in step S1) and determines whether the received operation is operation for instructing chromaticity correction (step S2). When the operation is not the operation for instructing the chromaticity correction (NO in step S2), the control section 160A executes processing corresponding to the received operation (step S3) and returns to the determination in step S1.

When the received operation is the operation for instructing the chromaticity correction (YES in step S2), first, the correction control section 163A instructs the projector 100B connected to the communication line 3 to start the chromaticity correction.

When a plurality of projectors 100 are connected to a LAN functioning as the communication line 3 and the user selects several projectors 100 out of the plurality of projectors 100 and causes the several projectors 100 to execute processing of the chromaticity correction, the projector 100A, which is the master machine, acquires apparatus names and IP addresses of the projectors 100 connected to the LAN. The projector 100A displays the acquired apparatus names and IP addresses on the operation panel 131A and sets, as the projector 100 on which the chromaticity correction is performed, the projector 100 selected by operation of the operation panel 131A or the remote controller 5A.

Subsequently, the correction control section 163A instructs the projection control section 161A to project a pattern image on the first projection region 141 (step S4). The projection control section 161A reads out pattern image data from the storing section 170A and projects, with the display section 110A, an image based on the read-out pattern image data (hereinafter referred to as pattern image) on the first projection region 141. In the pattern image, an image in which marks having a predetermined shape are arranged at lattice points of a lattice shape is formed.

Subsequently, the correction control section 163A causes the capturing control section 162A to generate captured image data. The capturing control section 162A controls the imaging section 140A to capture the screen SC direction and generates captured image data (step S5). When the generation of the captured image data by the capturing control section 162A ends, the correction control section 163A ends the projection of the pattern image on the first projection region 141.

Subsequently, the correction control section 163A instructs the projector 100B to project the pattern image based on the pattern image data on the second projection region 142 (step S6). In this embodiment, the pattern image projected on the second projection region 142 by the projector 100B is an image same as the pattern image projected on the first projection region 141 by the projector 100A. However, the shape of the marks may be changed in the pattern image projected on the first projection region 141 by the projector 100A and the pattern image projected on the second projection region 142 by the projector 100B.

After projecting the pattern image on the second projection region 142, a correction control section 163B of the projector 100B transmits, to the projector 100A, a notification signal for notifying that the pattern image is projected.

When receiving, from the projector 100B, the notification signal for notifying that the pattern image is projected, the correction control section 163A causes the capturing control section 162A to generate captured image data. The capturing control section 162A controls the imaging section 140A to capture the screen SC direction and generates captured image data (step S7).

Figure 5:
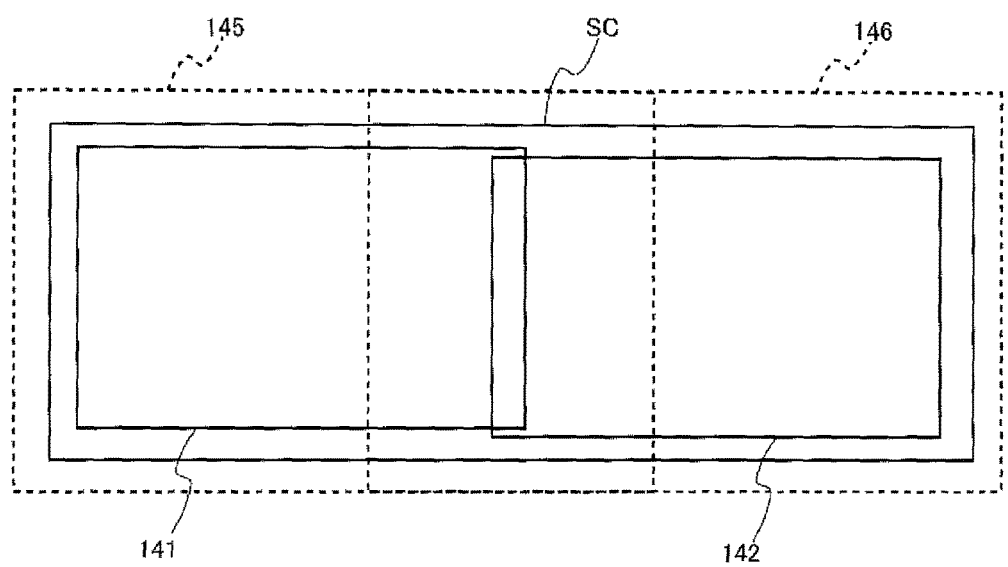
FIG. 5 is a diagram showing projection regions and capturing ranges of the projectors in the first embodiment.

FIG. 5 is a diagram showing projection regions and capturing ranges of the projectors 100A and 100B. The entire first projection region 141 and a part of the second projection region 142 are included in a capturing range 145 captured by the imaging section 140A of the projector 100A. As shown in FIG. 5, when the first projection region 141 is located on the left side on the screen SC and the second projection region 142 is located on the right side on the screen SC, a part of the left side of the second projection region 142 is included in the capturing range 145 of the imaging section 140A.

The entire second projection region 142 and a part of the first projection region 141 are included in a capturing range 146 captured by an imaging section 140B (a second imaging section) of the projector 100B. As shown in FIG. 5, when the first projection region 141 is located on the left side on the screen SC and the second projection region 142 is located on the right side on the screen SC, a part of the right side of the first projection region 141 is included in the capturing range 146 of the imaging section 140B.

Figure 6A:
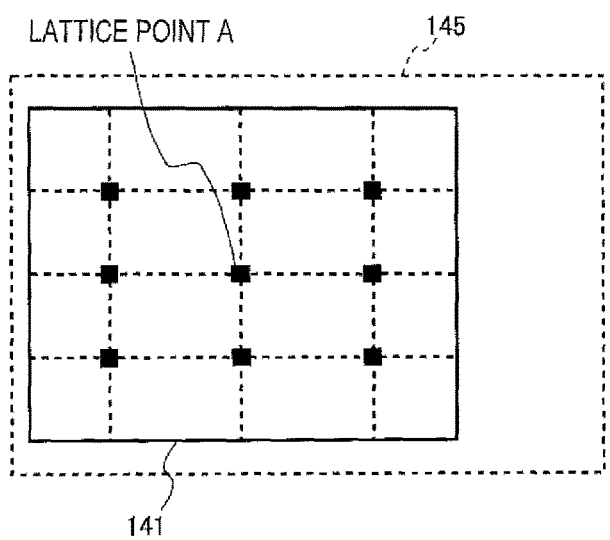
FIGS. 6A and 6B are diagrams showing captured image data generated by an imaging section.
Figure 6B:
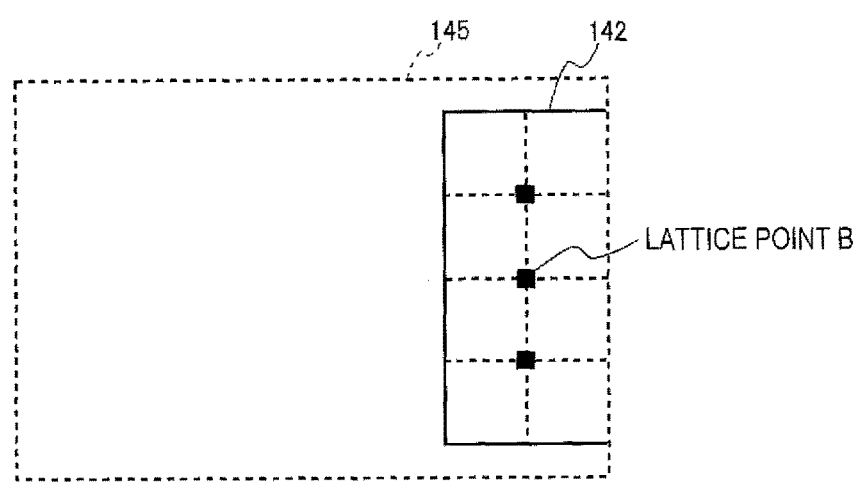

FIGS. 6A and 6B are diagrams showing captured image data generated by the imaging section 140A.

FIG. 6A shows captured image data obtained by capturing a state in which the projector 100A projects a pattern image on the first projection region 141 (hereinafter referred to as first captured image data). FIG. 6B shows captured image data obtained by capturing a state in which the projector 100B projects a pattern image on the second projection region 142 (hereinafter referred to as second captured image data).

As shown in FIGS. 6A and 6B, the entire pattern image projected on the first projection region 141 is captured by the imaging section 140A. A part of the pattern image projected on the second projection region 142 is captured by the imaging section 140A.

The first and second captured image data generated by the imaging section 140A are input to the correction control section 163A.

The correction control section 163A detects, from the input first captured image data, marks arranged at lattice points of the pattern image projected on the first projection region 141, specifies the respective lattice points, and specifies coordinates of the specified lattice points. The specified coordinates are coordinates in the first captured image data.

Subsequently, the correction control section 163A generates a correspondence table in which the specified coordinates of the lattice points in the first captured image data and coordinates of lattice points in pattern image data stored by the storing section 170A are registered in association with each other. Note that information for specifying the lattice points may be coordinates on the liquid crystal panel of the light modulating device 112A instead of the coordinates of the lattice points in the pattern image data. The correction control section 163A generates a correspondence table in which the coordinates of the lattice points of the captured image data and coordinates on the liquid crystal panel on which the lattice points of the pattern image data are drawn are associated with each other.

The correction control section 163A causes the storing section 170A to store the first and second captured image data and the correspondence table.

Subsequently, the correction control section 163A instructs the projection control section 161A to project image data for adjustment. The projection control section 161A reads out image data for adjustment set in advance from the storing section 170A and causes the display section 110A to project an image based on the read-out image data for adjustment (hereinafter referred to as image for adjustment (first image)) on the first projection region 141 of the screen SC (step S8). The image data for adjustment is data of single-color raster images prepared for each of colors of red (R), green (G), and blue (B) and is prepared for each of gradations set in advance.

When the image data for adjustment is projected on the screen SC, the correction control section 163A causes the capturing control section 162A to generate captured image data. The capturing control section 162A controls the imaging section 140A to capture the screen SC direction and generates captured image data (step S9). The captured image data obtained by capturing the first projection region 141 on which the image for adjustment is projected is hereinafter referred to as third captured image data (first captured image).

The correction control section 163A causes the projection control section 161A to project the images for adjustment having all the colors and all the gradations on the first projection region 141 and causes the capturing control section 162A to capture the images for adjustment of all the colors and all the gradations projected on the first projection region 14.

Subsequently, the correction control section 163A projects the images for adjustment having all the colors and all the gradations on the first projection region 141 and determines whether the capturing of the projected images for adjustment having all the colors and all the gradations has ended (step S10). When the capturing of the images for adjustment having all the colors and all the gradations has not ended (NO in step S10), the correction control section 163A causes the projection control section 161A to change at least one of the gradation and the color of the image for adjustment projected on the first projection region 141 (step S11) and repeats the processing from step S8.

When the capturing has ended in all the colors and all the gradations of the images for adjustment (YES in step S10), the correction control section 163A transmits, to the projector 100B, an instruction signal for instructing projection of the image for adjustment on the screen SC and causes the projector 100B to project the image for adjustment. That is, the correction control section 163A alternately switches the projection of the image for adjustment by the projector 100A and the projection of the image for adjustment by the projector 100B and alternately performs the capturing of the image for adjustment projected by the projector 100A and the image for adjustment projected by the projector 100B. The instruction signal includes information for instructing the color and the gradation of the image for adjustment projected on the screen SC.

When receiving the instruction signal, the correction control section 163B of the projector 100B causes a projection control section 161B to read out, from a storing section 170B, the image data for adjustment having the color and the gradation designated by the received instruction signal and project the image data for adjustment on the second projection region 142 of the screen SC (step S12). When the image for adjustment (the second image) is projected on the screen SC, the correction control section 163B transmits, to the projector 100A, a notification signal for notifying completion of the projection.

When receiving the notification signal from the projector 100B, the correction control section 163A of the projector 100A instructs the capturing control section 162A to generate captured image data. The capturing control section 162A controls the imaging section 140A to capture the screen SC direction and generates captured image data (step S13). The captured image data obtained by capturing a state in which the image for adjustment is projected on the second projection region 142 is hereinafter referred to as fourth captured image data (second captured image).

The correction control section 163A causes the projector 100B to project the images for adjustment having all the colors and all the gradations on the first projection region 141 and causes the capturing control section 162A to capture the images for adjustment having all the colors and all the gradations projected on the second projection region 142.

The correction control section 163A determines whether the images for adjustment have been projected on the second projection region 142 in all the colors and all the gradations of the images for adjustment and the capturing of the projected images for adjustment has ended (step S14).

When the capturing of the images for adjustment has not ended in all the colors and all the gradations (NO in step S14), the correction control section 163A causes the projector 100B to change at least one of the gradation and the color of the image for adjustment projected on the second projection region 142 (step S15) and repeats the processing from step S12.

When the capturing has ended in all the colors and all the gradations of the images for adjustment (YES in step S14) and the generation of the third and fourth captured image data has been completed, the correction control section 163A generates a correction value for each of the gradations and the colors. The correction value is a value for correcting the chromaticity (hue and chroma) of lattice points on the fourth captured image data to the chromaticity of lattice points on the third captured image data.

First, the correction control section 163A selects a color and a gradation for which correction values are generated. Subsequently, the correction control section 163A selects a lattice point on the pattern image data (hereinafter referred to as lattice point A (first position)) (step S16). The pattern image data is image data stored in the storing section 170A. The lattice point to be selected is optional. However, in this process flow, it is assumed that the correction control section 163A selects the lattice point A located in the center of the pattern image data shown in FIG. 6A.

Subsequently, the correction control section 163A selects the third captured image data having the color and the gradation for which correction values are generated, specifies, referring to the correspondence table, the position of the lattice point A in the selected third captured image data, and acquires an imaging value of the third captured image data in the specified position (step S17). The acquired imaging value is an imaging value of the lattice point A. After acquiring the imaging value, the correction control section 163A converts the acquired imaging value of the lattice point A into a value (an XYZ value) in an XYZ color system. The imaging value (the XYZ value) of the lattice point A is a target color.

Subsequently, the correction control section 163A selects, from the second captured image data, a lattice point on the pattern image projected on the second projection region 142 (step S18). The lattice point to be selected is optional. However, in this processing flow, it is assumed that the correction control section 163A selects a lattice point B (a second point) located in the middle of the pattern image data shown in FIG. 6B.

Subsequently, the correction control section 163A selects the fourth captured image data having the color and the gradation for which correction values are generated and specifies the position of the lattice point B in the selected fourth captured image data. The position of the lattice point B can be specified by comparing the second captured image data and the fourth captured image data.

After specifying the position of the lattice point B in the fourth captured image data, the correction control section 163A acquires an imaging value of the fourth captured image data in the specified position (step S19). The acquired imaging value is an imaging value of the lattice point B. After acquiring the imaging value, the correction control section 163A converts the acquired imaging value of the lattice point B into a value (an XYZ value) in the XYZ color system.

Subsequently, the correction control section 163A calculates a correction value (first correction data) for correcting an RGB ratio of the image data such that the XYZ value of the lattice point B is corrected to the XYZ value of the lattice point A (step S20).

Figure 7:
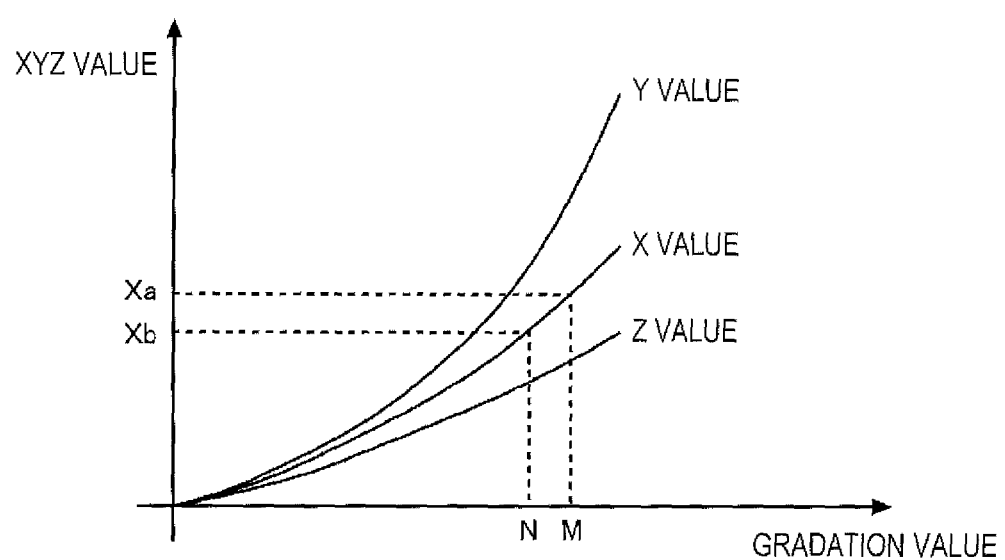
FIG. 7 is a diagram showing a change in each of gradations of an imaging value of the captured image data.

FIG. 7 is a diagram showing a change in each of gradations of the imaging values of the captured image data (the third and fourth captured image data) captured by the imaging section 140A. The vertical axis of FIG. 7 indicates a value (an XYZ value) in the XYZ color system of an imaging value and the horizontal axis indicates a gradation value.

The correction control section 163A calculates a correction value for correcting the XYZ value of the lattice point B to the XYZ value of the lattice point A. In FIG. 7, an X value of the XYZ value of the lattice point A is represented as Xa. A gradation value at the time when the X value is Xa is represented as "M". An X value of the XYZ value of the lattice point B is represented as Xb. A gradation value at the time when the X value is Xb is represented as "N". The correction control section 163A calculates a difference (M-N) between the gradation value "M" and the gradation value "N" as a correction value for correcting the X value of the lattice point B. The correction control section 163A calculates correction values for a Y value and a Z value in the same manner.

The correction control section 163A changes the color and the gradation for which correction values are generated and calculates correction values of the X value, the Y value, and the Z value in the same manner respectively for all the other colors and all the other gradations.

The correction value calculated by the correction control section 163A in the flow of S16 to S20 in FIG. 4 is a correction value in the gradation of the image for adjustment projected on the screen SC. The correction control section 163A also calculates, through an interpolation operation based on the calculated correction values of the gradations, correction values of gradations other than the gradations for which the correction values are calculated. After calculating the correction values, the correction control section 163A transmits the calculated correction values to the projector 100B.

When receiving the correction values from the projector 100A, a control section 160B of the projector 100B sets the received correction values as correction values for correcting all lattice points of the second projection region 142. Note that the projector 100B may perform processing for calculating correction values for gradations other than the gradation of the image for adjustment.

As explained above, in the first embodiment, the imaging section 140A of the projector 100A captures the first projection region 141 and a part of the second projection region 142. An imaging value of a lattice point of the first projection region 141 and an imaging value of a lattice point of a part of the second projection region 142 are calculated according to captured image data captured by the imaging section 140A. A correction value for correcting the imaging value of the lattice point of the second projection region 142 to the imaging value of the lattice point of the first projection region 141 is calculated.

Therefore, it is possible to calculate the imaging values of the lattice points of the first projection region 141 and a part of the second projection region 142 on the basis of the captured image data captured by the imaging section 140A and calculate the correction value for correcting the imaging value of the lattice point of a part of the second projection region 142 to the imaging value of the lattice point of the first projection region 141. Therefore, compared with when a correction value is calculated on the basis of captured image data captured by a plurality of imaging sections, it is possible to reduce an error included in the correction value.

Second Embodiment

The configuration of an image projection system 1 in a second embodiment is the same as the configuration in the first embodiment shown in FIGS. 1 and 2. Therefore, explanation of the configuration of the image projection system 1 in the second embodiment is omitted.

The second embodiment is an embodiment in which the chromaticity (hue and chroma) of an image projected on the first projection region 141 by the projector 100A is not uniform and the chromaticity of an image projected on the second projection region 142 by the projector 100B is not uniform. That is, the chromaticity of an image drawn on the liquid crystal panel included in the light modulating device 112A of the projector 100A is not uniform. The chromaticity of an image drawn on the liquid crystal panel included in a light modulating device 112B of the projector 100B is not uniform.

Figure 8:
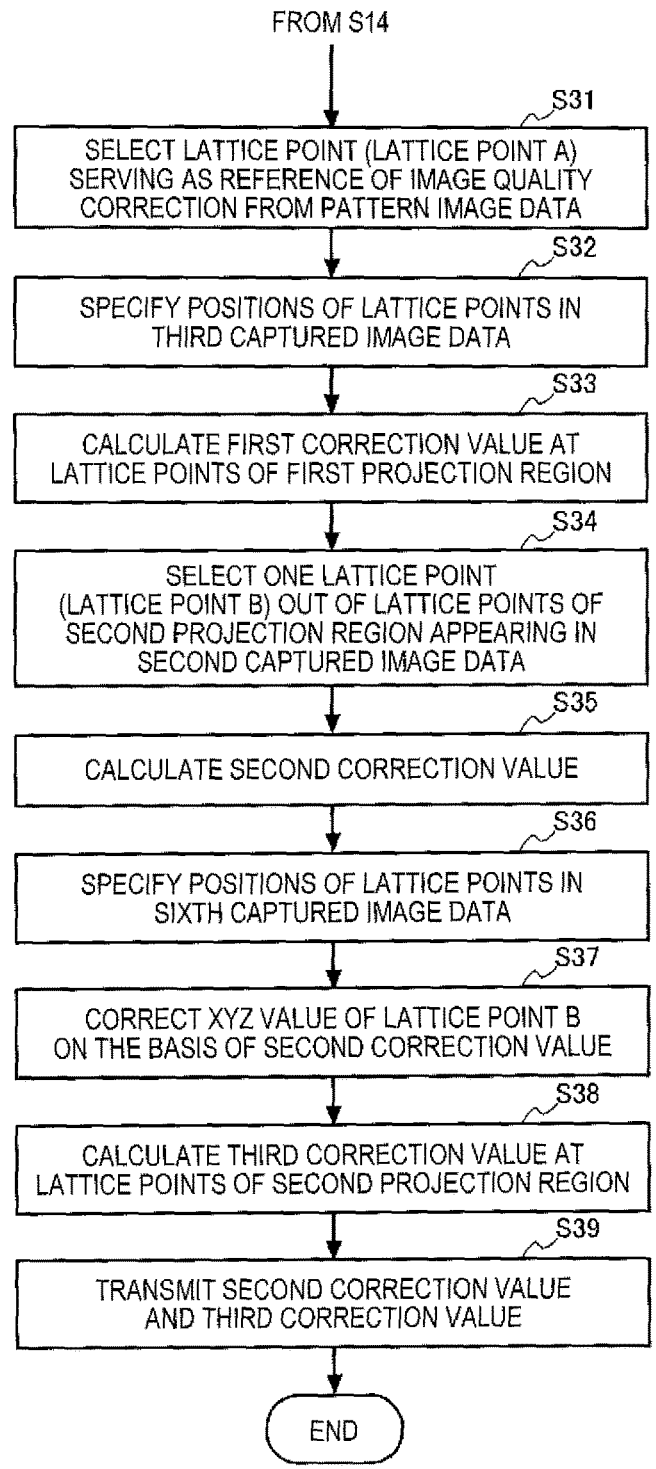
FIG. 8 is a flowchart showing the operation of projectors in a second embodiment.

FIG. 8 is a flowchart for explaining the operation of the projectors 100A and 100B in the second embodiment.

In this embodiment, the projectors 100A and 100B perform processing according to steps S1 to S15 in FIG. 3 and thereafter perform processing according to a flow shown in FIG. 8.

In the processing flow of steps S1 to S15 shown in FIG. 3, the second embodiment is different from the first embodiment in that, when the projector 100B projects the pattern image on the second projection region 142 of the projector 100B in step S6, in step S7, the imaging section 140A of the projector 100A and the imaging section 140B of the projector 100B perform capturing to generate captured image data.

The captured image data generated by the imaging section 140A is the second captured image data explained above. The captured image data generated by the imaging section 140B is hereinafter referred to as fifth captured image data. The correction control section 163B of the projector 100B transmits the generated fifth captured image data to the projector 100A.

Figure 9:
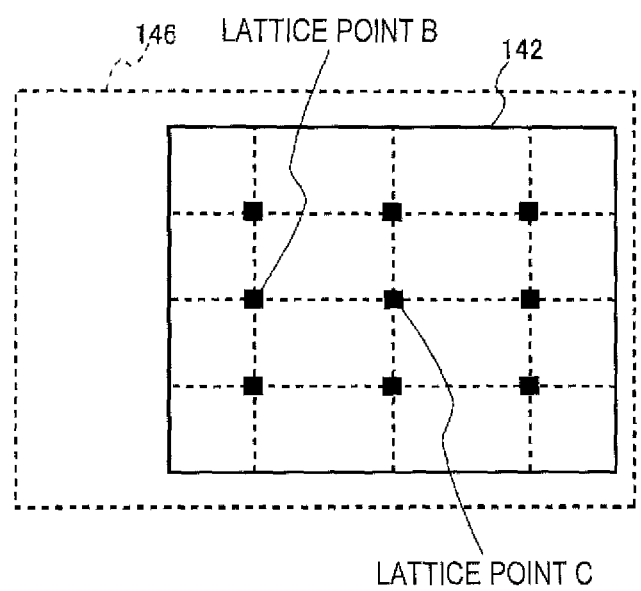
FIG. 9 is a diagram showing captured image data generated by an imaging section.

The fifth captured image data is shown in FIG. 9.

The second embodiment is also different from the first embodiment in that, when the projector 100B projects the image for adjustment on the second projection region 142 in step S12, in step S13, the imaging section 140A of the projector 100A and the imaging section 140B of the projector 100B perform capturing to generate captured image data.

The captured image data generated by the imaging section 140A is the fourth captured image data explained above. The captured image data generated by the imaging section 140B is referred to as sixth captured image data (a third captured image).

The correction control section 163B of the projector 100B transmits the generated sixth captured image data to the projector 100A.

The correction control section 163A selects a lattice point serving as a reference of chromaticity correction from pattern image data (step S31). The selected lattice point is referred to as lattice point A as in the first embodiment. The lattice point A may be any lattice point on the pattern image data. However, in this processing flow, it is assumed that a lattice point located in the center of the pattern image data is selected as the lattice point A (see FIG. 6A). The lattice point A is a lattice point serving as a reference for chromaticity correction. Processing for setting an XYZ value of the lattice point A as a target value and correcting XYZ value of other lattice points projected on the first projection region 141 to the target value is performed.

The correction control section 163A selects a color and a gradation for which correction values are generated and selects third captured image data of the selected color and gradation. The correction control section 163A specifies, referring to the correspondence table, positions of lattice points in the selected third captured image data (step S32). The lattice points in the third captured image data are the lattice points of the first projection region 141.

Subsequently, the correction control section 163A acquires imaging values of the third captured image data in the specified positions of the lattice points. After acquiring the imaging values, the correction control section 163A converts the acquired imaging values of the lattice points into values (XYZ values) in the XYZ color system.

Subsequently, the correction control section 163A calculates correction values for respectively correcting XYZ values of lattice points of the first projection region 141 other than the lattice point A to the XYZ value of the lattice point A (step S33). The correction value calculated for each of the lattice points is referred to as first correction value.

Subsequently, the correction control section 163A selects one lattice point out of lattice points of the second projection region 142 appearing in the second captured image data (step S34). As in the first embodiment, the selected lattice point is referred to as lattice point B (predetermined point) (see FIG. 6B). The lattice point B to be selected may be any lattice point of the second projection region 142 appearing in the second captured image data.

Subsequently, the correction control section 163A calculates a second correction value (step S35). The second correction value is a correction value at the lattice point B. The second correction value is a correction value for correcting an XYZ value of the lattice point B to the XYZ value of the lattice point A.

First, the correction control section 163A selects fourth captured image data obtained by capturing an image for adjustment having the selected color and gradation. The correction control section 163A compares the selected fourth captured image data and the second captured image data and specifies a position of the lattice point B in the fourth captured image data. The fourth captured image data is image data obtained by projecting the image for adjustment on the second projection region 142 and capturing the image for adjustment with the imaging section 140A of the projector 100A. The second captured image data is image data obtained by projecting a pattern image on the second projection region 142 and capturing the pattern image with the imaging section 140A of the projector 100A. The correction control section 163A acquires an imaging value of the fourth captured image data in the specified position. The imaging value is an imaging value of the lattice point B.

Subsequently, the correction control section 163A converts the imaging value of the lattice point B into an XYZ value.

Subsequently, the correction control section 163A selects, from the captured image data acquired from the projector 100B, the sixth captured image data obtained by capturing the image for adjustment having the selected gradation and color for which correction values are generated.

Subsequently, the correction control section 163A specifies positions of lattice points of the second projection region 142 in the sixth captured image data (step S36). The correction control section 163A compares the sixth captured image data and the fifth captured image data to specify the positions of the lattice points of the second projection region 142 in the sixth captured image data. The sixth captured image data is image data obtained by projecting an image for adjustment on the second projection region 142 and capturing the image for adjustment with the image imaging section 140B of the projector 100B. The fifth captured image data is image data obtained by projecting a pattern image on the second projection region 142 and capturing the pattern image with the imaging section 140B of the projector 100B.

Subsequently, the correction control section 163A acquires imaging values of the sixth captured image data at the specified lattice points of the second projection region 142. After acquiring the imaging values, the correction control section 163A converts the acquired imaging values of the lattice points into values (XYZ values) in the XYZ color system.

Subsequently, the correction control section 163A further specifies the lattice point B out of the specified lattice points of the second projection region 142 and corrects an XYZ value of the specified lattice point B on the basis of the second correction value (step S37). The correction control section 163A calculates a correction amount based on the second correction value and adds the calculated correction amount to the XYZ value of the lattice point B. The correction amount based on the second correction value is explained with reference to FIG. 10. The XYZ value of the lattice point B added with the correction amount based on the second correction value is a target value of correction in the second projection region 142.

Subsequently, the correction control section 163A calculates a correction value (hereinafter referred to as third correction value (second correction data)) for correcting respective XYZ values of lattice points (a plurality of places) other than the lattice point B of the second projection region 142 to the XYZ value of the lattice point B (a predetermined point), which is the target value (step S38). After calculating the third correction value for correcting the chromaticity of the lattice points of the second projection region 142, the correction control section 163A transmits the calculated second correction value and third correction value to the projector 100B (step S39).

Figure 10:
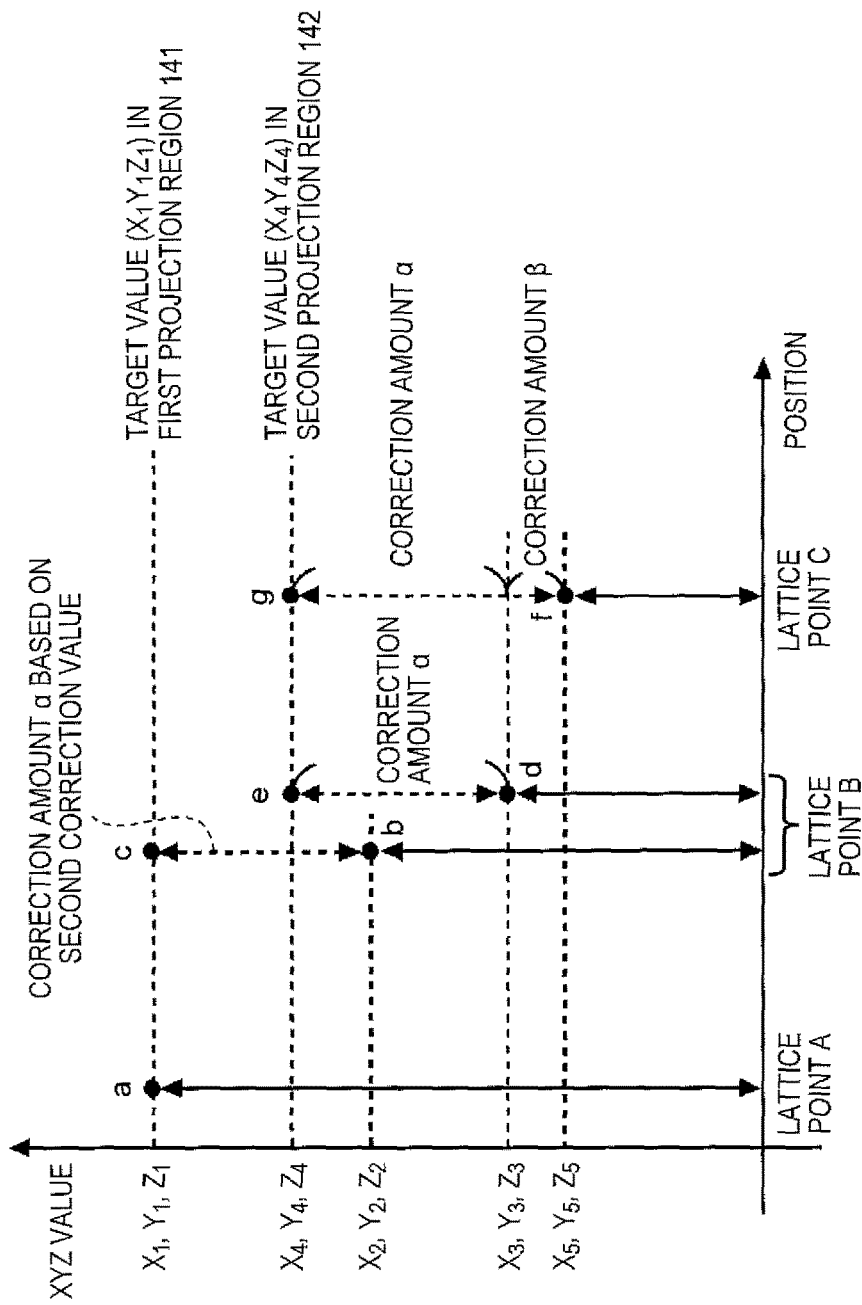
FIG. 10 is a principle explanatory diagram in the second embodiment.

FIG. 10 is a principle explanatory diagram in the second embodiment. In FIG. 10, the vertical axis indicates an XYZ value and the horizontal axis indicates positions of lattice points.

In this embodiment, unlike the first embodiment, two imaging sections, that is, the imaging section 140A of the projector 100A and the imaging section 140B of the projector 100B are used as imaging sections that generate captured image data.

When there is an individual difference between sensitivities of a camera included in the imaging section 140A and a camera included in the imaging section 140B, in some case, an error is included in an imaging value calculated on the basis of generated captured image data and the chromaticity of an image projected by the projector 100B cannot be accurately adjusted to the chromaticity of an image projected by the projector 100A.

In FIG. 10, an XYZ value of the lattice point A calculated from captured image data of the imaging section 140A is represented as a XYZ value $(X_1, Y_1, Z_1)$ of a point "a". The XYZ value $(X_1, Y_1, Z_1)$ of the lattice point A is a target value in the first projection region 141.

An XYZ value of the lattice point B calculated from the captured image data of the imaging section 140A is represented as a XYZ value $(X_2, Y_2, Z_2)$ of a point "b". A correction value of a gradation value calculated on the basis of a difference between the XYZ value $(X_1, Y_1, Z_1)$ of the lattice point A, which is the target value, and the XYZ value $(X_2, Y_2, Z_2)$ of the lattice point B is the second correction value. A correction amount of the XYZ value based on the second correction value for correcting the gradation value is represented as "α".

Note that, in FIG. 10, an XYZ value of a point "c" is the XYZ value $(X_1, Y_1, Z_1)$ obtained by correcting the XYZ value $(X_2, Y_2, Z_2)$ of the lattice point B with the correction amount α based on the second correction value.

An XYZ value of the lattice point B calculated from the captured image data of the imaging section 140B is represented as a XYZ value $(X_3, Y_3, Z_3)$ of a point "d". The correction control section 163A adds the correction amount α based on the second correction value to the XYZ value $(X_3, Y_3, Z_3)$ of the lattice point B and sets an XYZ value obtained by the addition as a target value in the second projection region 142. A value obtained by adding the correction amount α based on the second correction value to the XYZ value $(X_3, Y_3, Z_3)$ is set as an XYZ value $(X_4, Y_4, Z_4)$ of a point "e".

The correction control section 163A sets the XYZ value $(X_4, Y_4, Z_4)$ of the point "e" as a target value and corrects XYZ values of the other lattice points of the second projection region 142.

For example, it is assumed that an XYZ value of a lattice point C shown in FIG. 9 is an XYZ value $(X_5, Y_5, Z_5)$ of a point "f" shown in FIG. 10.

First, the correction control section 163A calculates a difference between the XYZ value $(X_5, Y_5, Z_5)$ of the lattice point C for which a correction value is calculated and the XYZ value $(X_3, Y_3, Z_3)$ of the lattice point B serving as a reference. The calculated difference is represented as a correction amount β. Subsequently, the correction control section 163A adds up the calculated correction amount β and the correction amount α based on the second correction value. An added-up value is a correction amount at the lattice point C.

In the above explanation, the chromaticity is corrected. However, the luminance of image data may be corrected in addition to the chromaticity. When the correction of the luminance is performed, it is also possible to select a lattice point of the first projection region 141 and a lattice point of the second projection region 142, compare the luminances of the lattice points, and set target luminance.

For example, it is assumed that the correction control section 163A selects, as the lattice point of the first projection region 141, the lattice point A (see FIG. 6A) located in the center of the first projection region 141 and selects, as the lattice point of the second projection region 142, the lattice point C (see FIG. 9) located in the center of the second projection region 142. The XYZ value of the lattice point A is represented as $(X_A, Y_A, Z_A)$ and the XYZ value of the lattice point C is represented as $(X_C, Y_C, Z_C)$.

The correction control section 163A compares a luminance value $Y_A$ of the lattice point A and a luminance value $Y_C$ of the lattice point C. When $Y_A < Y_C$, the correction control section 163A sets a target value of the first projection region 141 as $(X_A, Y_A, Z_A)$.

On the other hand, when $Y_A > Y_C$, the correction control section 163A sets, as a new target value of the first projection region 141, a value $(X_A, Y_A, Z_A) \times (Y_C/Y_A) = (X_A (Y_C/Y_A))$, $Y_C$, $Z_A (Y_C/Y_A))$ obtained by multiplying the target value $(X_A, Y_A, Z_A)$ with a ratio of $Y_A$ and $Y_C$ to equalize $Y_A$ and $Y_C$.

However, in the actual projector 100, luminance unevenness in which luminance decreases around the liquid crystal panel occurs because of characteristics of the light source. In the projector 100 (at least one of the projectors 100A and 100B) in which the luminance unevenness occurs, when the luminance is corrected to be a uniform value in a plane of the liquid crystal panel, a target value of the luminance may be set to luminance of a lattice point having the smallest value among the luminances of all the lattice points of the first projection region 141 and the second projection region 142.

However, when the target value of the luminance is set to the luminance of the lattice point having the smallest value among the luminances of all the lattice pints of the first projection region 141 and the second projection region 142, the luminance of an image projected on the screen SC is sometimes markedly reduced. Therefore, in order to prevent the marked decrease in the luminance, chromaticity may be corrected without changing the luminance.

For example, the present luminance is represented as $Y_W$ concerning a certain lattice point W and the luminance of the lattice point A in the center of the first projection region 141, which is the target value of the first projection region 141, is represented as $Y_A$.

The correction control section 163A multiplies the XYZ value $(X_A, Y_A, Z_A)$ of the lattice point A, which is the target value, with a ratio of the luminance value $Y_A$ of the lattice point A and the luminance value $Y_W$ of the lattice point W and sets $(X_A, Y_A, Z_A) \times (Y_W/Y_A) = (X_A(Y_W/Y_A)), Y_W, Z_A(Y_W/Y_A))$ as the target value at the lattice point W. The correction control section 163A calculates target values concerning all the other lattice points.

In this way, in the second embodiment, the projector 100A calculates, from the captured image data of the imaging section 140A, the imaging value of the lattice point of the second projection region 142 captureable by the imaging section 140A and the correction value for correcting the imaging value to the imaging value of the target lattice point set in the first projection region 141 and transmits the calculated correction value to the projector 100B.

The projector 100B calculates, from the captured image data of the imaging section 140B, the imaging value of the lattice point, for which the projector 100A calculates the correction value, and corrects the imaging value with the correction value transmitted from the projector 100A. Further, the projector 100B sets the corrected imaging value of the lattice point as the target value and corrects the imaging value of the lattice point of the second projection region 142. Therefore, data transmitted from the projector 100A to the projector 100B is only the correction value for correcting the imaging value of the lattice point. Therefore, even if the imaging value is calculated using the plurality of imaging sections 140A and 140B, it is possible to correct the imaging values of the lattice points of the second projection region 142 to be the target value set at the lattice point of the first projection region 141 without being affected by a sensitivity difference between the imaging sections 140A and 140B.

Modification 1

In the second embodiment explained above, the images are projected by the two projectors 100A and 100B. However, the number of projectors 100 is not limited to two.

Figure 11:
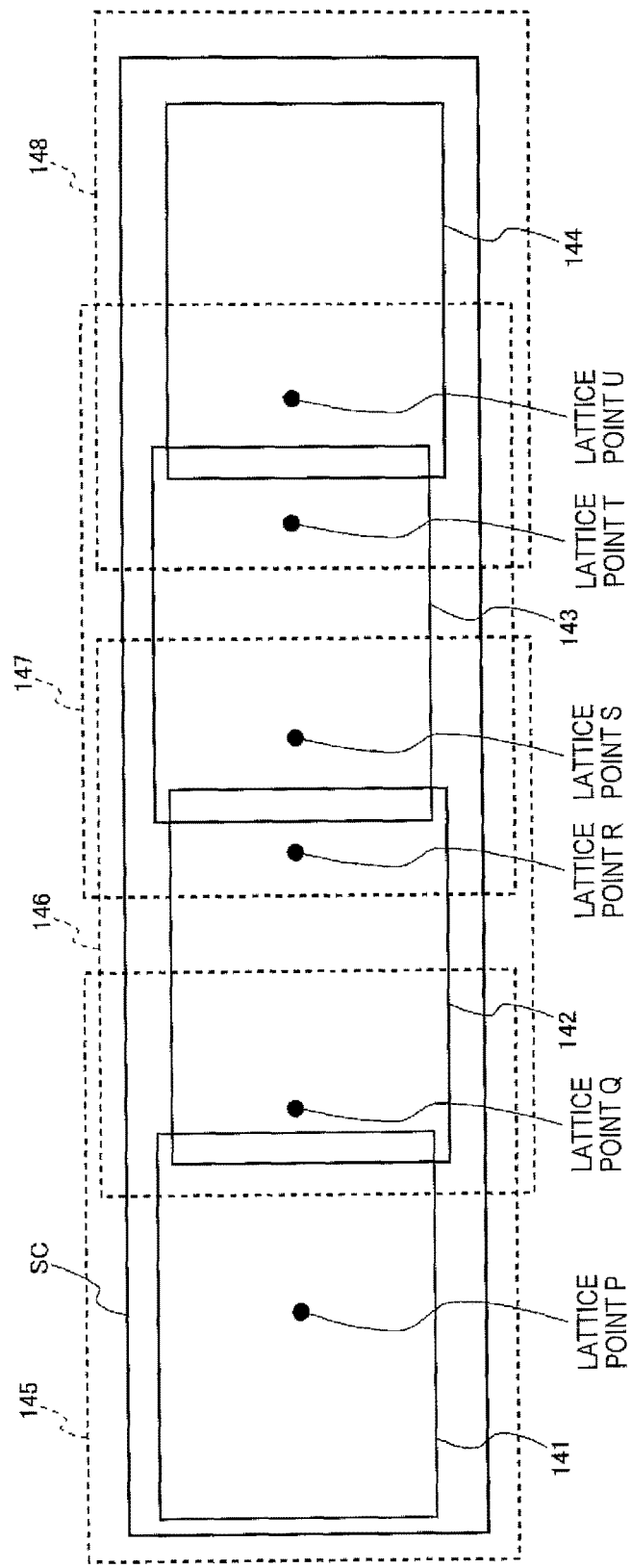
FIG. 11 is a diagram for explaining projection of images by four projectors.

FIG. 11 is a diagram for explaining correction of chromaticities of images projected by four projectors. An operation for disposing four projectors 100, that is, projectors 100A, 100B, 100C, and 100D to be adjacent to one another in the lateral direction (the horizontal direction) and correcting the chromaticities of images projected by the projectors 100 is explained. Note that, in this embodiment, as in the first and second embodiments, the projector 100A, which is the master machine, acquires captured image data generated by the other projectors 100B, 100C, and 100D and calculates correction values for lattice points of the second to fourth projection regions 142, 143, and 144.

In FIG. 11, it is assumed that the projector 100A projects an image on the first projection region 141 and a capturing range of the imaging section 140A is a capturing range 145. It is assumed that the projector 100B projects an image on the second projection region 142 and a capturing range of the imaging section 140B is a capturing range 146. It is assumed that the projector 100C projects an image on the third projection region 143 and a capturing range of an imaging section 140C is a capturing range 147. It is assumed that the projector 100D projects an image on the fourth projection region 144 and a capturing range of an imaging section 140D is a capturing range 148.

The correction control section 163A of the projector 100A calculates, according to the procedure explained above, a correction value (referred to as correction value q) for correcting an imaging value (an XYZ value) of a lattice point Q to an imaging value (an XYZ value) of a lattice point P in the center of the first projection region 141. The imaging value (the XYZ value) of the lattice point P and the imaging value (the XYZ value) of the lattice point Q are values calculated from captured image data generated by the imaging section 140A of the projector 100A capturing the capturing range 145. The lattice point Q is a lattice point of the second projection region 142 included in the capturing range 145 of the projector 100A and the capturing range 146 of the projector 100B. The correction control section 163A calculates the correction value q at the lattice point Q in the gradations set in the image for adjustment.

Subsequently, the correction control section 163A corrects, with the calculated correction value q of the lattice point Q, an imaging value (an XYZ value) of the lattice point Q obtained from captured image data generated by the imaging section 140B of the projector 100B capturing the capturing range 146. Subsequently, the correction control section 163A sets the corrected imaging value (XYZ value) of the lattice point Q as a target value and calculates a correction value (referred to as correction value r) for correcting an imaging value (an XYZ value) of a lattice point R. The lattice point R is a lattice point of the second projection region 142 included in the capturing range 146 of the projector 100B and the capturing range 147 of the projector 100C. The imaging value (the XYZ value) of the lattice point R is a value calculated from captured image data obtained by the imaging section 140B of the projector 100B capturing the capturing range 146. The correction control section 163A calculates the correction value r at the lattice point R with the gradations set in the image for adjustment explained above.

Subsequently, the correction control section 163A corrects, with the calculated correction value r of the lattice point R, an imaging value (an XYZ value) of the lattice point R obtained from captured image data generated by the imaging section 140C of the projector 100C capturing the capturing range 147. Subsequently, the correction control section 163A sets the corrected imaging value (XYZ value)

of the lattice point R as a target value and calculates a correction value (referred to as correction value s) for correcting an imaging value (an XYZ value) of a lattice point S. The lattice point S is a lattice point of the third projection region 143 included in the capturing range 146 of the projector 100B and the capturing range 147 of the projector 100C. The imaging value (the XYZ value) of the lattice point S is a value calculated from captured image data obtained by the imaging section 140C of the projector 100C capturing the capturing range 147. The correction control section 163A calculates the correction value s at the lattice point S with the gradations set in the image for adjustment explained above.

Subsequently, the correction control section 163A calculates, according to the same procedure, a correction value t of a lattice point T of the third projection region 143 and a correction value u of a lattice point U of the fourth projection region 144.

After calculating the correction value q of the lattice point Q of the second projection region 142, the correction control section 163A calculates correction values for the other lattice points of the second projection region 142 on the basis of the calculated correction value q and the captured image data generated by the imaging section 140B of the projector 100B. Further, the correction control section 163A calculates correction values for the other lattice points of the third projection region 143 and correction values for the other lattice points of the fourth projection region 144 in the same manner.

The correction control section 163A transmits the calculated correction values for the lattice points of the second projection region 142 to the projector 100B. The correction control section 163A transmits the calculated correction values for the lattice points of the third projection region 143 to the projector 100C. Further, the correction control section 163A transmits the calculated correction values for the lattice points of the fourth projection region 144 to the projector 100D.

In the modification 1, the correction control section 163A of the projector 100A calculates the correction values for the lattice points. However, the projector 100B may calculate the correction value for the lattice point R of the second projection region 142. The projector 100C may calculate the correction value for the lattice point T of the third projection region 143.

For example, after calculating the correction value q of the lattice point Q, the correction control section 163A of the projector 100A transmits the calculated correction value q to the projector 100B.

The correction control section 163B of the projector 100B corrects, with the correction value q of the lattice point Q received from the projector 100A, the imaging value (the XYZ value) of the lattice point Q obtained from the captured image data generated by the imaging section 140B capturing the capturing range 146.

The correction control section 163B sets the corrected imaging value (XYZ value) of the lattice point Q as the target value and calculates the correction value r for correcting the imaging value (the XYZ value) of the lattice point R. The correction control section 163B transmits the calculated correction value r to the projector 100C.

Subsequently, in the same manner, a correction control section 163C of the projector 100C corrects, with the correction value r of the lattice point R received from the projector 100B, the imaging value (the XYZ value) of the lattice point R obtained from the captured image data generated by the imaging section 140C capturing the capturing range 147.

The correction control section 163C sets the corrected imaging value (XYZ value) of the lattice point R as the target value and calculates the correction value s for correcting the imaging value (the XYZ value) of the lattice point S. The correction control section 163C transmits the calculated correction value s to the projector 100D.

Modification 2

In the first embodiment and the second embodiment explained above, the projector 100A, which is the master machine, calculates the correction values for the lattice points of the first projection region 141 and the second projection region 142.

In a modification 2, the projector 100B calculates correction values for the lattice points of the second projection region 142.

After calculating the correction values for the lattice points of the first projection region 141, the correction control section 163A of the projector 100A transmits the correction values for the lattice points of the first projection region 141 captureable by the imaging section 140B of the projector 100B to the projector 100B.

Figure 12:
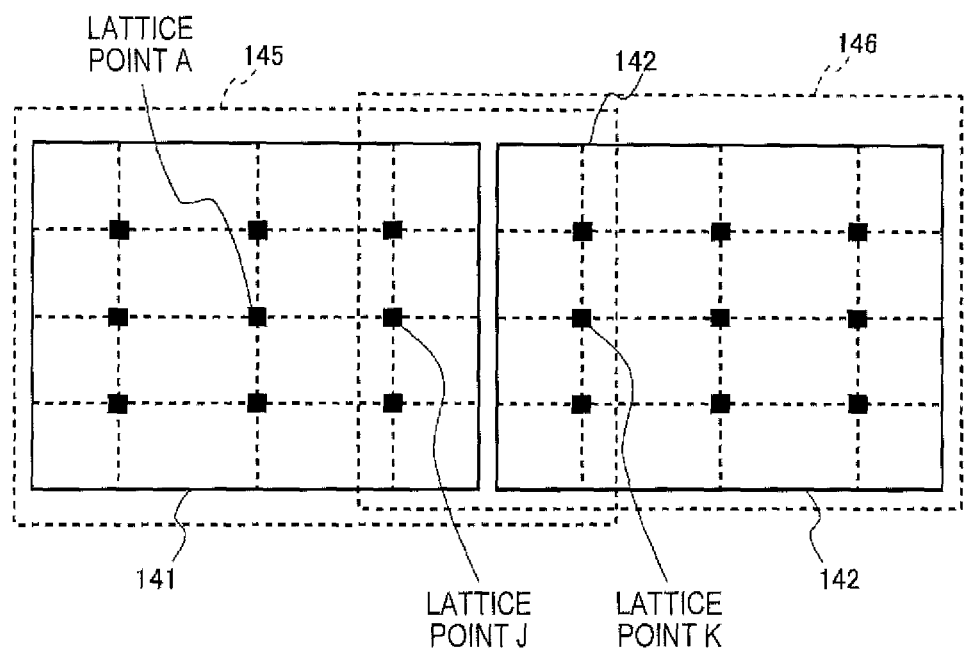
FIG. 12 is a diagram for explaining an operation in a modification.

FIG. 12 is a diagram for explaining an operation in the modification.

The correction control section 163A of the projector 100A transmits, to the projector 100B, a correction value (hereinafter referred to as correction value j) for a lattice point (e.g., a lattice point J shown in FIG. 12), which is a lattice point captureable by the imaging section 140B of the projector 100B, and information capable of specifying a position of the lattice point (a position of the lattice point J). When the position of the lattice point, the correction value for which is transmitted to the projector 100B by the projector 100A, is a position set in advance, the projector 100A does not need to transmit the information capable of specifying the position of the lattice point (the position of the lattice point J) to the projector 100B. The information capable of specifying the position of the lattice point is, for example, information for specifying a lattice point in the middle of a row on a rightmost side among lattice points projected on the first projection region 141.

When receiving the correction value j of the lattice joint J, the correction control section 163B of the projector 100B corrects, with the received correction value j of the lattice point J, an imaging value (an XYZ value) of the lattice point J generated from the captured image data obtained by the imaging section 140B capturing the capturing range 146.

The correction control section 163B of the projector 100B sets the corrected imaging value (XYZ value) of the lattice point J as a target value in the second projection region 142 and calculates a correction value for correcting imaging values of the lattice points (e.g., a lattice point K shown in FIG. 12) of the second projection region 142.

The correction control section 163A of the projector 100A may transmit, in addition to the correction value j at the lattice point J, an imaging value (an XYZ value) of the lattice point J calculated from the captured image data captured by the imaging section 140A to the projector 100B as the second correction data.

In this case, the correction control section 163B of the projector 100B calculates a difference (hereinafter referred to as difference value) between the imaging value (the XYZ value) of the lattice point J generated from the captured image data captured by the imaging section 140B and the imaging value (the XYZ value) of the lattice point J received from the projector 100A. The correction control section 163B recognizes the calculated difference value as a difference between the sensitivities of the camera of the imaging section 140A and the camera of the imaging section 140B.

Subsequently, the correction control section 163B adds the difference value and a correction amount based on the correction value j to the imaging value (the XYZ value) of the lattice point J generated from the captured image data captured by the imaging section 140B. An added-up value is the same as the imaging value (the XYZ value) obtained by capturing, with the imaging section 140A of the projector 100A, the lattice point A in the center of the first projection region 141 shown in FIG. 6A.

The correction control section 163B sets the calculated imaging value (XYZ value) of the lattice point J as a target value and corrects imaging values (XYZ values) of the lattice points of the second projection region 142 generated from the captured image data captured by the imaging section 140B.

As explained above, the image projection systems according to the first embodiment and the second embodiment include the projectors 100A and 100B.

The projector 100A includes the projection optical system 113A that projects the image for adjustment and the imaging section 140A that captures the range including at least a part of the projected image for adjustment and at least a part of the image for adjustment projected by the projector 100B. The projector 100B includes a projection optical system 113B (the second projecting section) that projects the image for adjustment.

The image projection system 1 sets the target color on the basis of the third captured image data obtained by capturing, with the imaging section 140A, at least a part of the image for adjustment projected by the projection optical system 113A.

The image projection system 1 calculates, on the basis of the fourth captured image data obtained by capturing, with the imaging section 140A, at least a part of the image for adjustment projected by the projection optical system 113B, the correction value for correcting the color of the projected image of the projector 100B to the target color.

Therefore, when the plurality of projectors 100A and 100B project images, it is possible to accurately perform correction of the images projected by the projectors 100A and 100B to the target color.

The image projection system 1 sets the imaging value of the position of the lattice point A of the third captured image data as the target color and calculates the correction value for correcting the projected image in the projector 100B such that the imaging value of the position of the lattice point B of the fourth captured image data is corrected to the imaging value of the lattice point A. Therefore, in the projector 100B, it is possible to correct the imaging value of the position of the lattice point B of the projected image to the target color.

The projector 100A includes the correction control section 163A that sets the imaging value of the position of the lattice point A of the third captured image data to the target color and calculates the correction value for correcting the projected image in the projector 100B such that the imaging value of the position of the lattice point B of the fourth captured image data is corrected to the imaging value of the position of the lattice point A. Further, the projector 100A includes the communication section 175A that transmits the correction value calculated by the correction control section 163A to the projector 100B.

Therefore, it is possible to calculate a correction value in the projector 100A and transmit the calculated correction value to the projector 100B.

The correction value is data for correcting the color of the position of the lattice point B of the fourth captured image data to the target color. The projector 100B includes the imaging section 140B that captures the range including at least a part of the image for adjustment projected by the projection optical system 113B. The projector 100B calculates, on the basis of sixth captured image data obtained by capturing, with the imaging section 140B, at least a part of the image for adjustment projected by the projection optical system 113B, the third correction value for correcting colors of positions of a plurality of lattice points of the image for adjustment to the color of the position of the lattice point B of the fourth captured image data. Therefore, it is possible to calculate, on the basis of the sixth captured image data obtained by capturing, with the imaging section 140B, at least a part of the image for adjustment projected by the projection optical system 113B, the third correction value for correcting the colors of the positions of the plurality of lattice points of the image for adjustment to the color of the position of the lattice point B of the fourth captured image data.

The correction control section 163A of the projector 100A calculates, on the basis of the sixth captured image data received from the projector 100B, the third correction value for correcting the colors of the positions of the plurality of lattice points of the image for adjustment to the color of the lattice point B. Therefore, it is possible to calculate the third correction value in the projector 100A on the basis of the sixth captured image data captured by the projector 100B.

The first and second embodiments and the modifications thereof are preferred implementation forms of the invention. However, the invention is not limited to the implementation forms. Various modified implementations are possible within a range not departing from the spirit of the invention.

For example, in the first and second embodiments, the projector 100A located on the left side is the master machine. However, the projector 100 set as the master machine is not limited to the projector 100A located on the left side.

In the first and second embodiments, the center of the first projection region 141 (that is, the center of the liquid crystal panel) of the projector 100A is set as the target values of the chromaticity and the luminance. However, another portion of the first projection region 141 or a projection region of the projector 100 other than the projector 100A, which is the master machine, may be set as the target value of at least one of the chromaticity and the luminance. It is also possible to cause the storing section 170A to store a target value set in advance and, in adjustment of the chromaticity and the luminance, set a value read out from the storing section 170A as the target value. Further, the user can also operate the operation panel 131A or the remote controller 5A, cause the projector 100A to capture the screen SC with the imaging section 140A, set a target value of at least one of the chromaticity and the luminance on the basis of captured image data, and cause the storing section 170A to store the set target value.

Further, different target values of the chromaticity and the luminance may be set according to a position on the liquid crystal panel. For example, in a range in which images projected from the plurality of projectors 100 overlap, a target value may be calculated from the captured image data captured by the imaging section 140A. In other ranges, the target value stored in the storing section 170A in advance may be used.

In the following explanation, a value of chromaticity set by the user in advance operating the operation panel 131A or the remote controller 5A is set as a target value. Chromaticities of the lattice points of the first projection region 141 and the second projection region 142 are corrected to the target value. The target value of the chromaticity set by the user in advance is stored by the storing section 170A.

The correction control section 163A of the projector 100A instructs the projection control section 161A to project an image for adjustment on the first projection region 141 of the screen SC and instructs the capturing control section 162A to capture the projected image for adjustment and generate the third captured image data.

The correction control section 163A instructs the projector 100B to project the image for adjustment on the second projection region 142 and instructs the capturing control section 162A to capture the projected image for adjustment and generate the fourth captured image data.

The correction control section 163A calculates, on the basis of the generated third captured image data, correction values (third correction data) for respectively correcting the imaging values (the XYZ values) of the lattice points of the first projection region 141 to be the target value stored in the storing section 170A. The correction control section 163A calculates, on the basis of the generated fourth captured image data, a correction value (fourth correction data) for correcting the imaging value (the XYZ value) of the lattice point (e.g., the lattice point B shown in FIG. 6B) of the second projection region 142 to be the target value stored in the storing section 170A.

The correction control section 163A calculates correction values for the lattice points of the first projection region 141 and a correction value for the lattice point of the second projection region 142 in all the colors of RGB and all the gradations set in advance. The correction control section 163A calculates correction values of gradations other than the gradations set in advance according to an interpolation operation based on the calculated correction values of the gradations. The correction control section 163A corrects imaging values (XYZ values) of the lattice points of the first projection region 141 using the calculated correction values for the lattice points of the first projection region 141. The correction control section 163A transmits the calculated correction value for the lattice point of the second projection region 142 to the projector 100B.

The correction control section 163B of the projector 100B calculates, on the basis of the correction value received from the projector 100A, in all the colors of RGB and in all the gradations set in advance, correction values for correcting the imaging values (the XYZ values) of the lattice points of the second projection region 142 captured by the imaging section 140B. The correction control section 163B also calculates, through an interpolation operation based on the calculated correction values of the gradations, correction values of gradations other than the gradations set in advance. The correction control section 163B sets the calculated correction values as correction values for the lattice points of the second projection region 142. Therefore, it is possible to accurately perform correction of images projected by the projectors 100A and 100B to a target color.

The correction control section 163A of the projector 100A may acquire the fifth captured image data captured by the imaging section 140B from the projector 100B and calculate a correction value on the basis of the acquired fifth captured image data. The correction control section 163A calculates, on the basis of the fifth captured image data, in all the colors of RGB and all the gradations set in advance, the correction value (the fourth correction data) for correcting the imaging values (the XYZ values) of the lattice points of the second projection region 142 to be the target value stored in the storing section 170A. The correction control section 163A also calculates, through an interpolation operation based on the calculated correction values of the gradations, correction values of gradations other than the calculated gradations. After calculating the correction values, the correction control section 163A transmits the calculated correction values to the projector 100B.

The correction control section 163B of the projector 100B sets the correction values received from the projector 100A as correction values for the lattice points of the second projection region 142. Therefore, it is possible to accurately perform correction of images projected by the projectors 100A and 100B to the target color.

In the first and second embodiments, the projectors 100A and 100B are explained as the liquid crystal projectors including the transmissive liquid crystal panels. However, the projectors 100A and 100B may be projectors including reflective liquid crystal panels or digital mirror devices.

The functional sections of the projectors 100A and 100B shown in FIG. 2 indicate functional components realized by cooperation of hardware and software. Specific implementation forms of the functional sections are not particularly limited. Therefore, hardware individually corresponding to the functional sections does not always need to be implemented. It is also naturally possible to adopt a configuration in which one processor executes a computer program to realize functions of a plurality of functional sections. A part of the functions realized by the software in the embodiments may be realized by the hardware. Alternatively, apart of the functions realized by the hardware may be realized by the software.

What is claimed is:
1. An image projection system comprising:
a first projector; and
a second projector, wherein
the first projector includes:
 a first projecting section configured to project a first image; and
 a first imaging section configured to capture a range including at least a part of the first image projected by the first projecting section and at least a part of a second image projected by the second projector,
the second projector includes a second projecting section configured to project the second image, and
the image projection system sets a target color on the basis of a first captured image obtained by capturing, with the first imaging section, at least a part of the first image projected by the first projecting section and calculates, on the basis of a second captured image obtained by capturing, with the first imaging section, at least a part of the second image projected by the second projecting section, first correction data for correcting a color of a projected image of the second projector to the target color, the correcting occurring based upon lattice points, the image projection system generating a correspondence table in which specified coordinates of the lattice points in data of the first captured image and coordinates of stored lattice points in pattern image data are registered in association with each other, wherein:

the first correction data is data for correcting a color of a first point in the second captured image to the target color, the first correction data being a first value, the first value being a difference between the target color and an imaging value of the first point in the second captured image, the second projector includes a second imaging section configured to capture a third captured image, the third captured image being obtained by capturing at least a part of the second image projected by the second projecting section, and the image projection system calculates, on the basis of the third captured image and the first correction data, second correction data for correcting a color of a second point to the target color by adding the first value and a second value that is a difference between an imaging value of the first point in the third captured image and an imaging value of the second point in the third captured image.

2. The image projection system according to claim 1, wherein the image projection system sets an imaging value of a first position on the first captured image as the target color and calculates the first correction data for correcting the projected image in the second projector such that an imaging value of a second position on the second captured image is corrected to the imaging value of the first position.

3. The image projection system according to claim 1, wherein the first projector includes:

a first calculating section configured to set an imaging value of a first position on the first captured image as the target color and calculate the first correction data for correcting the projected image such that an imaging value of a second position on the second captured image is corrected to the imaging value of the first position; and a transmitting section configured to transmit the first correction data calculated by the first calculating section to the second projector.

4. The image projection system according to claim 1, wherein the first projector includes a second calculating section configured to calculate, on the basis of the third captured image received from the second projector, the second correction data for correcting the colors of the plurality of places in the second image to the color of the predetermined point.

5. The image projection system according to claim 1, wherein the first projector includes:

a first calculating section configured to set an imaging value of a first position on the first captured image as the target color and calculate the first correction data for correcting the second image in the second projector such that an imaging value of a second position on the second captured image is corrected to the imaging value of the first position; and a transmitting section configured to transmit the first correction data calculated by the first calculating section to the second projector, and the second projector calculates, on the basis of the first correction data received from the first projector, the second correction data for correcting colors of a plurality of places in the second image to the color of the predetermined point.

6. A projector comprising:

a projecting section configured to project a first image;

an imaging section configured to capture a range including at least a part of the first image projected by the projecting section and at least a part of a second image projected by another projector including an other imaging section; and a first calculating section configured to set a target color on the basis of a first captured image obtained by capturing, with the imaging section, at least a part of the first image projected by the projecting section and calculates, on the basis of a second captured image obtained by capturing, with the imaging section, at least a part of the second image projected by the other projector, first correction data for correcting a color of a projected image of the other projector to the target color, the correcting occurring based upon lattice points, the projector generating a correspondence table in which specified coordinates of the lattice points in data of the first captured image and coordinates of stored lattice points in pattern image data are registered in association with each other, wherein:

the first correction data is data for correcting a color of a first point in the second captured image to the target color, the first correction data being a first value, the first value being a difference between the target color and an imaging value of the first point in the second captured image, and the projector calculates, on the basis of a third captured image and the first correction data, second correction data for correcting a color of a second point to the target color by adding the first value and a second value that is a difference between an imaging value of the first point in the third captured image and an imaging value of the second point in the third captured image, the third captured image being obtained by capturing, with the other imaging section, at least a part of the second image projected by the another projector.

7. The projector according to claim 6, wherein the projector sets an imaging value of a first position on the first captured image as the target color and calculates the first correction data for correcting the projected image in the another projector such that an imaging value of a second position on the second captured image is corrected to the imaging value of the first position.

8. The projector according to claim 6, wherein the projector includes:

a transmitting section configured to transmit the first correction data calculated by the first calculating section to the another projector.

* * * * *